United States Patent
Tanuma et al.

(10) Patent No.: US 6,862,098 B1
(45) Date of Patent: Mar. 1, 2005

(54) APPARATUS AND METHOD FOR MEASURING DISPLACEMENT

(75) Inventors: Atsuro Tanuma, Zama (JP); Kouji Ohmori, Kanagawa (JP); Kazuki Nagatsuka, Atsugi (JP); Eiji Tsujimura, Atsugi (JP)

(73) Assignee: Anritsu Corporation, Tokyo (JP)

( * ) Notice: Subject to any disclaimer, the term of this patent is extended or adjusted under 35 U.S.C. 154(b) by 0 days.

(21) Appl. No.: 09/914,351
(22) PCT Filed: Feb. 26, 1999
(86) PCT No.: PCT/JP99/00927
§ 371 (c)(1),
(2), (4) Date: Aug. 27, 2001
(87) PCT Pub. No.: WO00/52417
PCT Pub. Date: Sep. 8, 2000

(51) Int. Cl.[7] .............................................. G01B 11/14
(52) U.S. Cl. ...................................... 356/623; 356/614
(58) Field of Search ................................ 356/614–622, 356/623

(56) References Cited

FOREIGN PATENT DOCUMENTS

| JP | 3-180707 | 8/1991 |
|---|---|---|
| JP | 5-322529 | 12/1993 |
| JP | 6-26842 | 2/1994 |
| JP | 10-300420 | 11/1998 |

*Primary Examiner*—Gregory J. Toatley, Jr.
*Assistant Examiner*—Amanda Merlino
(74) *Attorney, Agent, or Firm*—Manabu Kanesaka

(57) ABSTRACT

Apparatus for measuring displacement that measures the displacement (the irregularities) of the surface of a measuring object precisely and at high speed is provided. The apparatus for measuring displacement scans light radiated toward the surface of the measuring object and measures the amount of displacement of the surface of the measuring object without contact based upon the position of an image formation point formed on the light receiving plane of a light receiving element. Light receiving means is provided with a lens array composed of plural condenser lenses which converges measuring beams and an imaging lens for forming an image formation point on the light receiving plane by converged measuring beams. Reflected light from an irradiation point is converged by the lens array. The converged reflected light is imaged on the light receiving plane by the imaging lens.

13 Claims, 23 Drawing Sheets

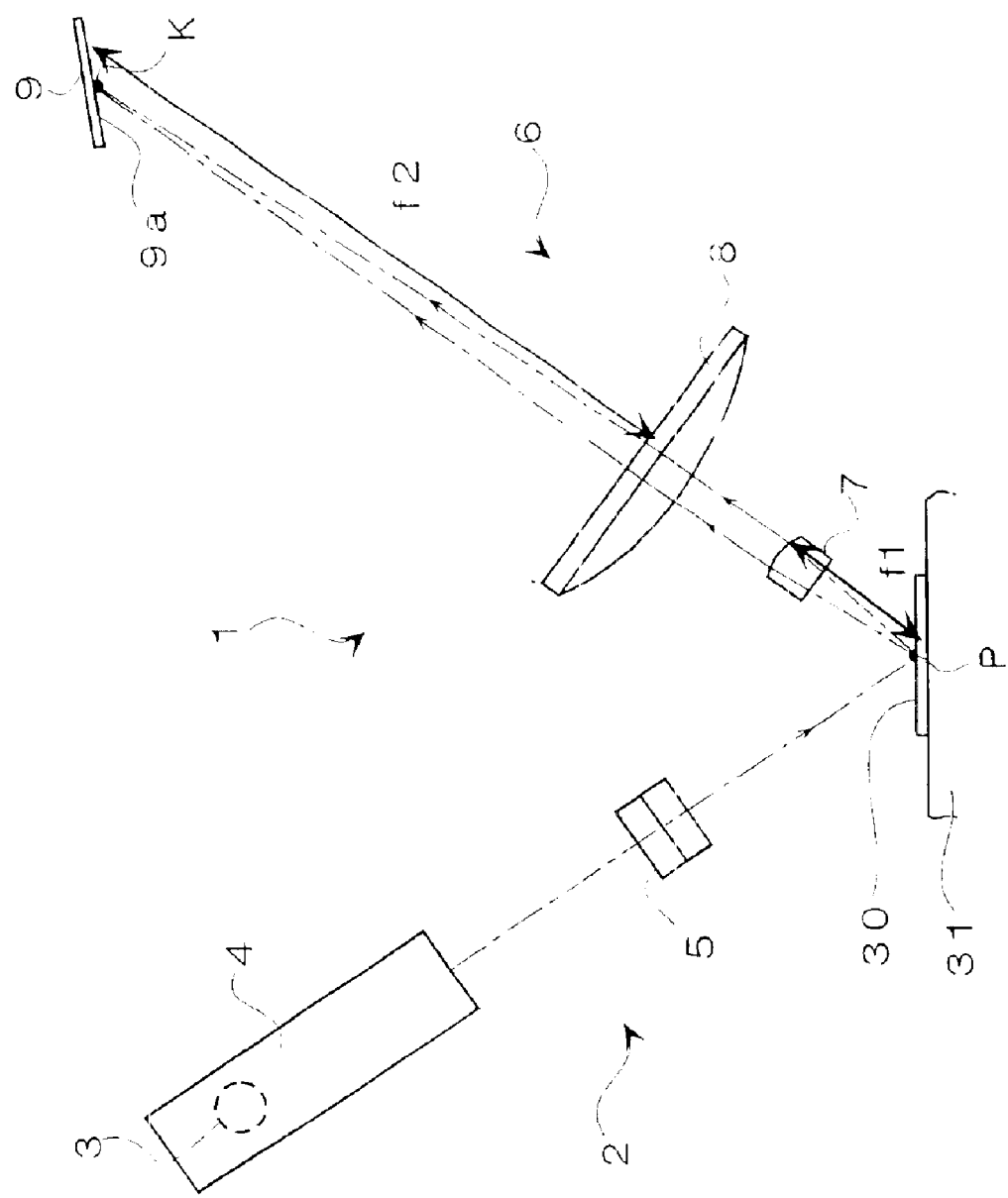

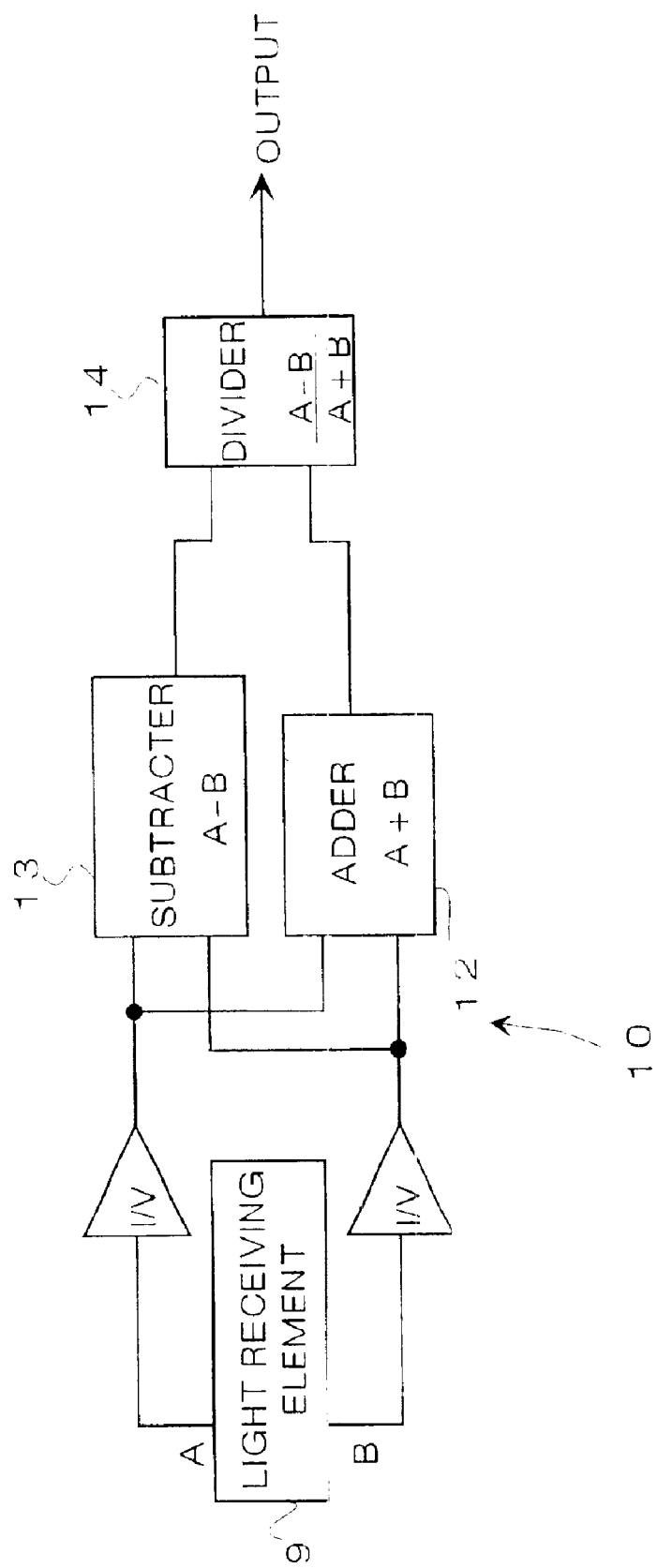

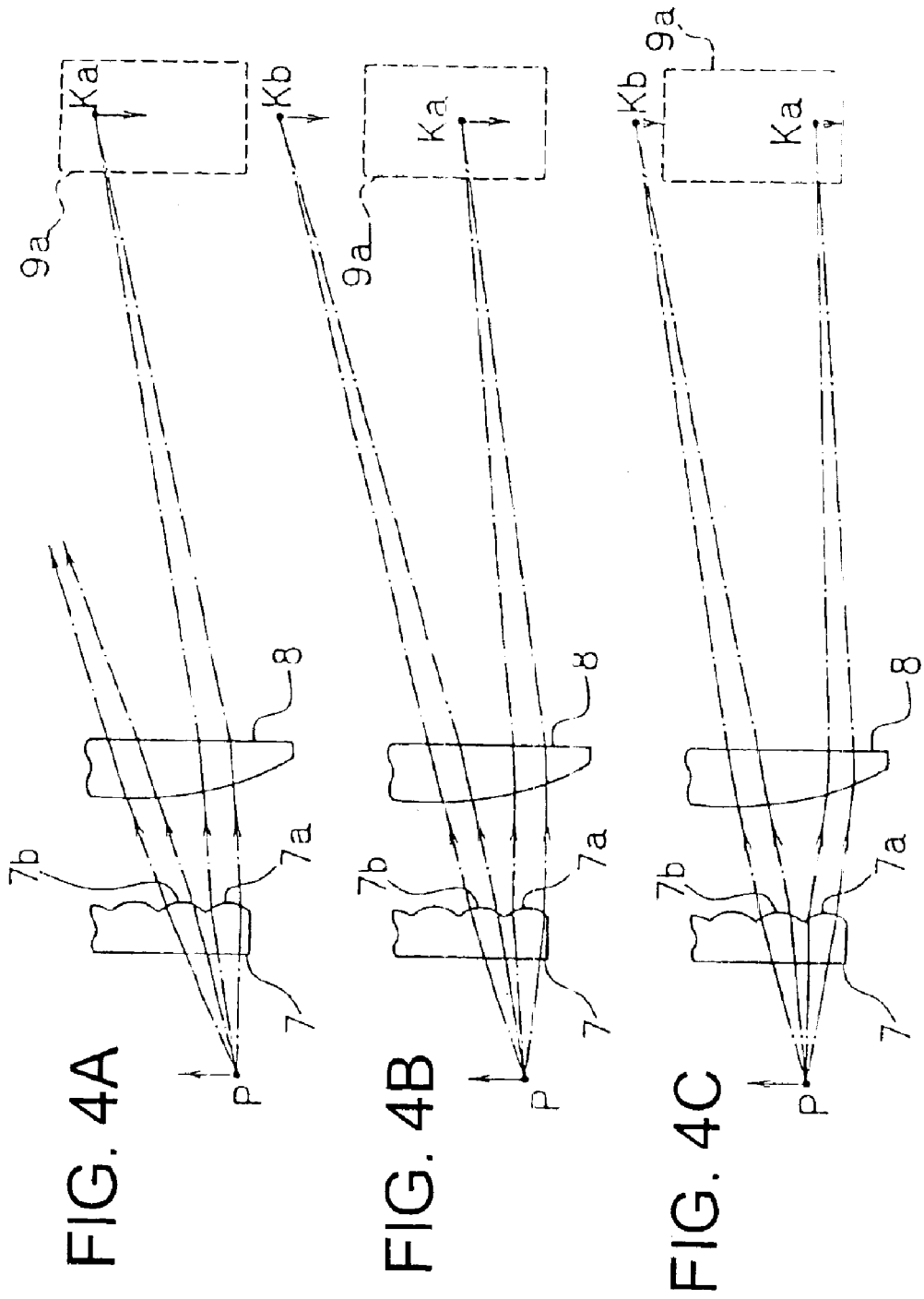

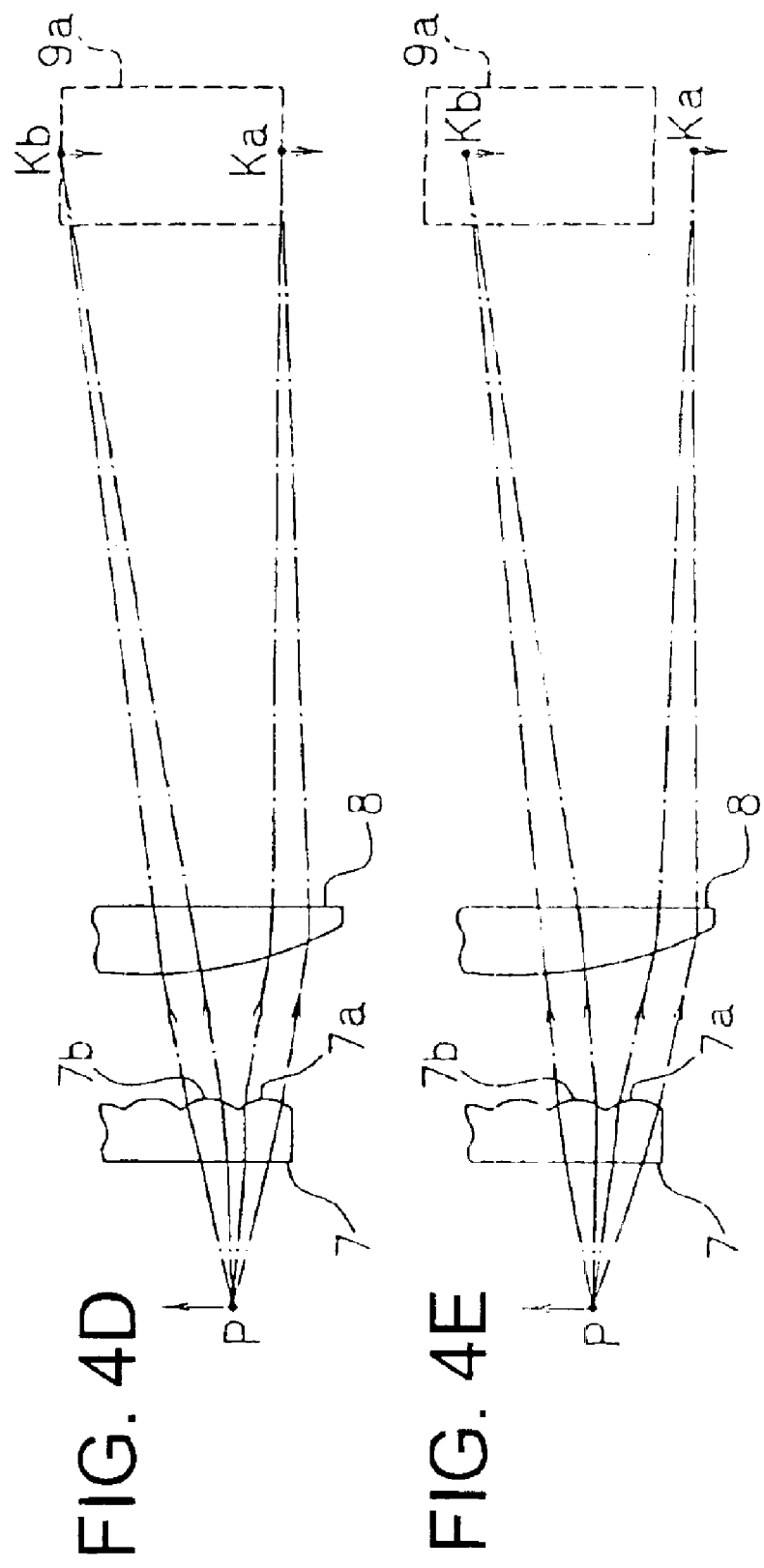

SCAN DIRECTION

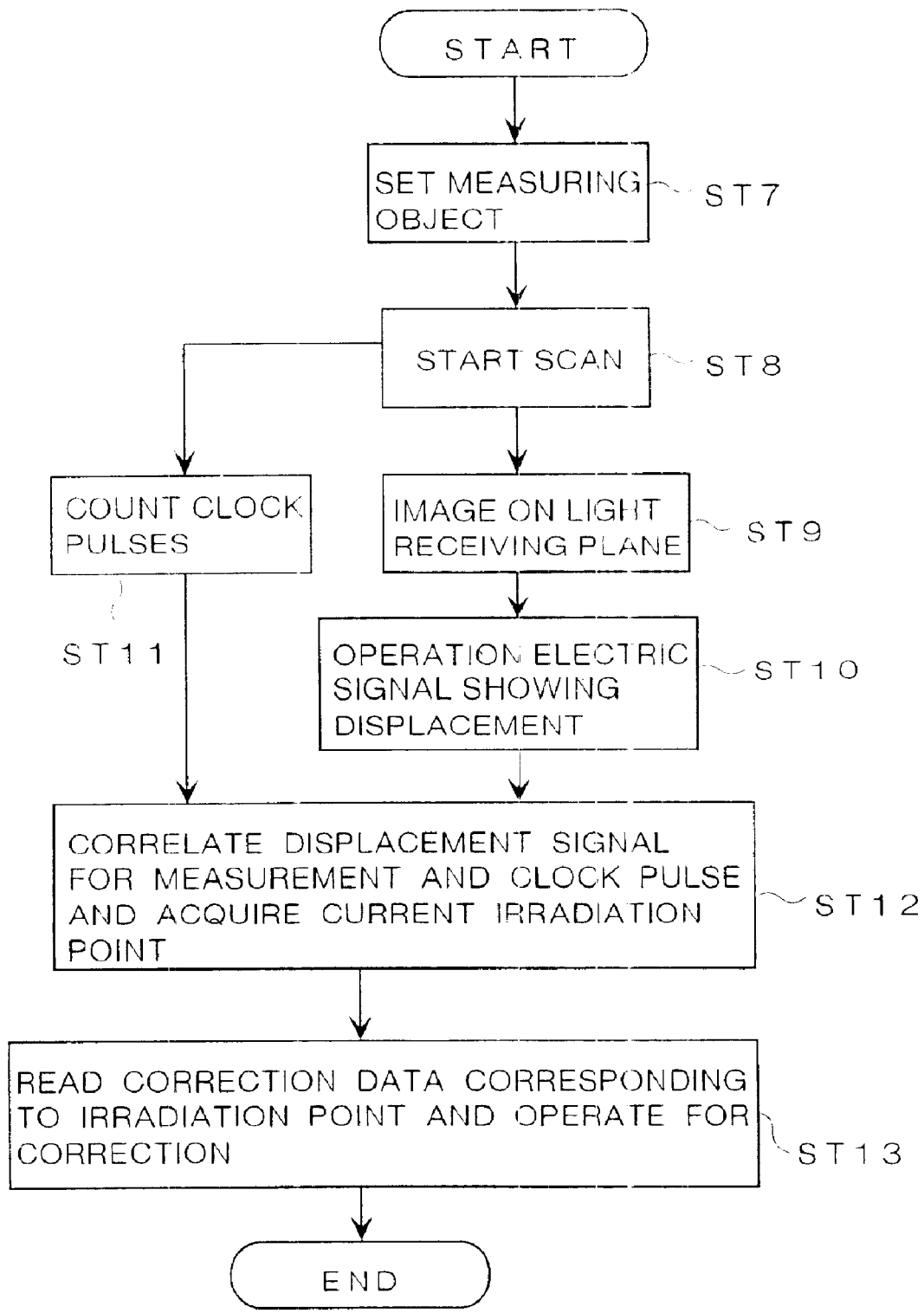

APPARATUS AND METHOD FOR MEASURING DISPLACEMENT

BACKGROUND OF THE INVENTION AND RELATED ART STATEMENT

The present invention relates to apparatus and method for measuring displacement for measuring the displacement amount of a surface of a measuring object without contact by scanning an irradiation point formed by light radiated onto the surface of the measuring object at a fixed interval utilizing triangulation by light. Particularly, the present invention relates to apparatus and method for measuring displacement for enhancing displacement detection precision and a measurement rate using a lens array. The present invention also relates to apparatus and method for measuring displacement that enable precisely acquiring the amount of displacement by correcting an error due to the dispersion of a position and a direction in which a lens array is installed and the focal length.

In case the displacement (irregularities) in the height of a surface of a measuring object is (are) measured using light, an apparatus for measuring displacement depending upon triangulation is used. In the apparatus for measuring displacement, a laser beam is radiated on the surface of a measuring object 52 from a projector 51 as shown in FIG. 20 and an image K at an irradiation point P is imaged on the light receiving plane of a light receiving element 54 through an imaging lens 53.

This light receiving element 54 outputs a signal corresponding to the amount of displacement in which an image formation point on the light receiving plane moves from the position of K to K' or K". The light receiving element 54 is arranged to tilt for the optical axis of the imaging lens 53 as shown in FIG. 20. The light receiving element 54 enables imaging in any position on the light receiving plane.

In this apparatus for measuring displacement, the irradiation point P moves in the direction of the height because of irregularities (displacement) on the surface of the measuring object 52 to be an irradiation point P' or P". Hereby, an image formation point K on the light receiving plane of the light receiving element 54 moves to the position of an image formation point K' or K". A signal from the light receiving element 54 also changes according to the amount of displacement of the image formation point K. The displacement in the height of the surface of the measuring object can be detected based upon the amount of the change of the signal.

The above mentioned apparatus for measuring displacement is provided with a mechanism for relatively displacing the measuring object 52 to the direction of the x-axis and the direction of the y-axis respectively orthogonal to the direction of the height. This mechanism is a low-speed mechanism normally driven by a motor and others. Therefore, when the measurement in minute pitch of the whole surface of the measuring object 52 is tried, it takes very long time.

Therefore, recently, the displacement of a measuring object 70 can be measured by only displacement in only the direction of the y-axis using scanning-type apparatus for measuring displacement 60 shown in FIG. 21. FIG. 21 is a schematic perspective view showing the scanning-type apparatus for measuring displacement 60.

A projecting system of the scanning-type apparatus for measuring displacement 60 is composed of a light source 61, a deflector 62 such as an oscillating mirror type and a convergent lens 63. Light radiated from the light source 61 is deflected in a range of fixed angles by the deflector 62. The deflected radiated light goes on one plane parallel with the optical axis of the convergent lens 63. The radiated light is incident on the surface 70a of the measuring object 70 set on a measuring table 71 at a predetermined angle of incidence. An irradiation point P formed by the radiated light is linearly scanned on both ways or on one way.

The radiated light is regularly reflected in the position of the irradiation point P on a light receiving system. An image of the irradiation point P is imagined on a light receiving plane 66a of a light receiving element 66 via a first cylindrical lens 64 and a second cylindrical lens 65. In this apparatus for measuring displacement 60, in case the reflectance of the surface 70a of the measuring object is high as that of a mirror, most of light reflected at the irradiation point P is incident on the light receiving system at the same angle as the angle of incidence based upon the irradiation point P.

However, in case the surface 70a of the measuring object is rough, the reflectance is low. In this case, the conventional scanning-type apparatus for measuring displacement 60 using the cylindrical lenses 64 and 65 for the light receiving system has a problem that when reflected light from the irradiation point P is scattered and is imaged on the light receiving plane 66a, an image on the light receiving plane is 66a of the light receiving element 66 becomes dim and the precision of measurement is remarkably deteriorated.

That is, the cylindrical lenses 64 and 65 basically show convergence in only the peripheral direction of the cylindrical face of each lens and have no convergence in other directions. Therefore, as shown in FIG. 22A, scattered light diffuse in the circumference of the cylindrical face of the first cylindrical lens 64 out of measuring beams reflected at the irradiation point P is converged by the first cylindrical lens 64 and is incident on the second cylindrical lens 65. The light is deflected by the second cylindrical lens 65 so that the light goes to the center of the light receiving plane 66a of the light receiving element 66 and forms an image formation point K on the light receiving plane 66a.

Also, as shown in FIG. 22B, scattered light diffuse in the axial direction of the cylindrical face of the first cylindrical lens 64 out of menacing beams reflected at the irradiation point P is not converged by the first cylindrical lens 64 at all and is incident on the second cylindrical lens 65 in a state in which the light is diffuse. Therefore, an image formation point K on the light receiving plane 66a of the light receiving element 66 becomes a straight line extended in the width direction of the light receiving plane 66a.

In addition, an image at the irradiation point P is converged by only the first cylindrical lens 64 the focal length of which is short. Therefore, an image K on the light receiving plane 66a of the light receiving element 66 is in the shape of arm ellipse long sideways because of the aberration of the first cylindrical lens 64 as shown in FIG. 23. Therefore, the image K in the shape of the ellipse long sideways cannot be made circular by converging it by the first cylindrical lens 64. Hereby, the variation of a signal output from the light receiving element 66 increases. Therefore, displacement on the measured surface cannot be measured at high precision.

Further, as shown in FIG. 24, the surface 70a of a measuring object 70 has irregularities and may have predetermined difference in a level 70b. In such a form, when light radiated from a projecting system is regularly reflected by a light receiving system, reflected light may be intercepted by this difference in a level 70b. In this case, displacement in the vicinity of a part having difference in a level 70b cannot be measured.

SUMMARY OF THE INVENTION

The invention is made to remove the above-mentioned defects and the object is to provide apparatus for measuring displacement that measures the displacement (the irregularities) of the surface of a measuring object precisely and at high speed.

To achieve the object, apparatus for measuring displacement according to a first aspect of the invention is based upon apparatus for measuring displacement that scans light radiated onto the surface of a measuring object and measures the displacement amount of the surface of the measuring object without contact based upon a position in which an image formation point formed on the light receiving plane of a light receiving element is detected. Further, the above-mentioned apparatus for measuring displacement comprises projecting means that radiates the scanned radiated light on the surface of the measuring object to form an irradiation point and light receiving means having the light receiving element that receives a measuring beam from the irradiation point on the light receiving plane of the light receiving element and forms the image formation point. The light receiving means is provided with a lens array and an imaging lens. The lens array is composed of plural condenser lenses having a uniform image formation characteristic around the optical axis and provided along the scan direction of the radiated light for converging the measuring beams. The imaging lens has a uniform image formation characteristic around its own optical axis for guiding the converged measuring beams onto the light receiving plane and forms the image formation point.

The light receiving element may be also provided in a position apart by its focal length from the imaging lens as in a second aspect.

According to the above-mentioned configuration, light radiated onto the surface of the measuring object is scanned by the projecting means and is reflected on the side of the light receiving means. Measuring beams from the irradiation point are the reflected light or the scattered light of radiated light at the irradiation point formed on the surface of the measuring object. The measuring beams are converged in a direction orthogonal to a scan direction by the lens array. The converged measuring beams are imaged on the light receiving plane of the light receiving element by the imaging lens having a uniform image formation characteristic around the optical axis.

Therefore, the measuring beams converged by the lens array can be imaged on the light receiving plane in a state in which aberration is small. Hereby, the displacement of the surface of the measuring object can be precisely measured.

Further, as described in a third aspect, each optical axis of the plural condenser lenses is mutually parallel and the plural condenser lenses composing the lens array are arranged in parallel in a line orthogonal to each optical axis in a position respectively apart by the focal length from the irradiation point.

It is known that the larger light receiving width parallel to a direction scanned by radiated light is, the slower the speed of response of a light receiving element is. A light receiving element the light receiving width of the light receiving plane of which is small and the speed of response of which is fast can be used by configuring small plural condenser lenses so that they converge measuring beams from an irradiation point. Hereby, the speed of a scan is accelerated, the processing speed of the light receiving element for the output of a signal can be accelerated and measuring time can be reduced.

Desirably, as described in a fourth aspect, when positional relationship among the lens array, the imaging lens and the light receiving element meets $0<(f1/f2) \cdot t<w$, an optimum image formation characteristic is acquired. However, w means light receiving width parallel to the direction of a scan on the light receiving plane, t means the width of each condenser lens parallel to the direction of a scan, f1 means the focal length of each condenser lens and f2 means the focal length of the imaging lens.

The apparatus for measuring displacement may be also configured as described in a fifth aspect so that the projecting means vertically radiates the scanned radiated light on the surface of the measuring object and forms an irradiation point and a pair of light receiving means are provided apart by equal distance from the irradiation point in symmetrical positions based upon an optical path plane in the direction of a scan of the radiated light.

According to the above-mentioned configuration, radiated light vertically incident on the surface of the measuring object is scanned by the projecting means and is scattered in all directions in case the measuring object has a rough surface. A part of scattered measuring beams is converged in a direction orthogonal to the direction of a scan by the lens array. The converged measuring beams are imaged on the light receiving plane of the light receiving element by the imaging lens having a uniform image formation characteristic around the optical axis.

Therefore, measuring beams converged by the lens array can be imaged on the light receiving plane in a state in which aberration is small. Hereby, the displacement of the surface of the measuring object can be precisely measured. Particularly, even if measuring beams on the side of one light receiving means are intercepted by difference in a level on the surface of the measuring object and the sufficient amount of beams is not acquired, the displacement is measured by beams acquired by the other light receiving means and the precision of measurement can be maintained.

The apparatus for measuring displacement according to the fifth aspect is characterized in that it is provided with displacement operation means that operates and outputs a signal telling the displacement of the surface of the measuring object based upon a position of the image formation point formed on each light receiving plane of a pair of light receiving elements as described in a sixth aspect.

The displacement operation means is characterized as concretely described in a seventh aspect in that it is provided with two preadders that add a pair of electric signals acquired from symmetrical positions based upon the optical path plane of the scanned radiated light after four electric signals acquired according to an image formation position on each light receiving plane of a pair of light receiving elements are converted from current to voltage, an adder that adds each electric signal acquired in the preadders, a subtracter that subtracts an electric signal acquired in one of the preadders from an electric signal acquired in the other and a divider that divides the electric signal acquired in the subtracter by the electric signal acquired in the adder.

According to the above mentioned configuration, the displacement operation means can measure the amount of displacement precisely by adding and subtracting after adding electric signals output from the light receiving element beforehand even if the amount of received light varies, the configuration of the divider is simplified and the cost of the apparatus for measuring displacement can be reduced.

As described in an eighth aspect, the displacement operation means is provided with an adder and a subtracter in every light receiving means. The adder adds a pair of electric signals after the electric signals acquired in an image formation position on each light receiving plane of the light receiving element are respectively converted from current to voltage. The subtracter subtracts one of the pair of electric signals from the other respectively. The displacement operation means may be also provided with an addition signal adder that adds addition signals acquired each adder, a subtraction signal adder that adds subtraction signals acquired from each subtracter and a divider that divides an electric signal acquired in the subtraction signal adder by an electric signal acquired in the addition signal adder.

According to the above-mentioned configuration, even if balance in the sensitivity and others of both light receiving means is not uniform, the gain control and others of an amplifier can be facilitated and the displacement measurement precision can be enhanced.

Further, as described in a ninth aspect, the above-mentioned displacement operation means is provided with an adder, a subtracter and a divider in every light receiving means. The adder adds a pair of electric signals after a pair of the electric signals acquired in an image formation position on the light receiving plane of the light receiving element are respectively converted from current to voltage. The subtracter subtracts one of the pair of electric signals from the other. The divider divides a subtraction signal acquired in the subtracter by an addition signal acquired in the adder respectively. The displacement operation means may be also provided with switching means to which each displacement signal corresponding to a value divided in each divider and a displacement signal corresponding to the average value of the divided values are input and which outputs any displacement signal, level determination means that determines whether each addition signal meets a predetermined reference value or not and selecting means that selectively outputs a suitable one of each displacement signal input to the switching means based upon the result of determination in the level determination means.

According to the above-mentioned configuration, in the displacement operation means, the signal-to-noise ratio can be made satisfactory without increasing a noise level by adding, subtracting and dividing every light receiving means, determining whether each addition signal meets a predetermined reference value or not and outputting a suitable displacement signal acquired by division based upon the result of determination and the displacement measurement precision can be enhanced. Particularly, when the amount of received light is small, predetermined precision can be also acquired.

Apparatus for measuring displacement according to a tenth aspect is based upon apparatus for measuring displacement that scans radiated light on the surface of a measuring object and measures the amount of displacement of the surface of the measuring object based upon a position in which an image formation point formed on the light receiving plane of a light receiving element is detected without contact. Further, the above-mentioned apparatus for measuring displacement comprises projecting means, light receiving means, displacement operation means and processing means. The projecting means radiates the scanned radiated light on the surface of the measuring object to form an irradiation point. The light receiving means has the light receiving element that receives a measuring beam from the irradiation point on the light receiving plane of the light receiving element and forms the image formation point. The light receiving means is provided with a lens array and an imaging lens. The lens array is composed of plural condenser lenses having a uniform image formation characteristic around the optical axis and provided along the scan direction of the radiated light for converging the measuring beams. The imaging lens has a uniform image formation characteristic around its own optical axis for guiding the converged measuring beams onto the light receiving plane and forms the image formation point. The displacement operation means operates and outputs the amount of displacement of the surface of the measuring object based upon an electric signal corresponding to the position of the image formation point and output from the light receiving element. The processing means respectively detects the deviation of an image formation position caused because of the dispersion of image formation positions by light passed in the lens array in plural locations in the direction of a scan, corrects and outputs the amount of displacement of the surface of the measuring object based upon the detected deviation.

As described in an eleventh aspect, the above-mentioned processing means is characterized in that it is provided with deviation detection means that detects the deviation of the image formation position using a reference object, correction value storage means that stores deviation detected by the deviation detection means as correction data and displacement correction means that corrects and outputs the amount of displacement output from the displacement operation means based upon the correction data stored in the correction value storage means in measuring the amount of displacement of the surface of the measuring object.

Further, as described in a twelfth aspect, the apparatus for measuring displacement according to the eleventh aspect is provided with scan initiation detection means that outputs a scan initiation signal every time the radiated light scans and counting means that counts the current radiated light scan position based upon a scan initiation signal from the scan initiation detection means and is characterized in that the deviation detection means correlates the detected deviation with the current radiated light scan position output from the counting means and stores in the correction value storage means as correction data and the displacement correction means reads correction data corresponding to the current radiated light scan position output from the counting means from the correction value storage means, corrects and outputs a signal for the amount of displacement output from the displacement operation means by the read correction data.

Apparatus for measuring displacement according to a thirteenth aspect is based upon apparatus for measuring displacement that scans light radiated onto the surface of a measuring object and measures the amount of displacement of the surface of the measuring object without contact based upon the detected position of an image formation point formed on the light receiving plane of a light receiving element. The above-mentioned apparatus for measuring displacement is provided with projecting means, the light receiving means, scan initiation detection means and processing means. The projecting means radiates the scanned radiated light on the surface of the measuring object to form an irradiation point. The light receiving means has the light receiving element that receives a measuring beam from the irradiation point on the light receiving plane of the light receiving element and forms the image formation point. The light receiving means is provided with a lens array and an imaging lens. The lens array is composed of plural condenser lenses having a uniform image formation characteristic around the optical axis and provided along the scan direction of the radiated light for converging the measuring beams. The imaging lens has a uniform image formation characteristic around its own optical axis for guiding the converged measuring beams onto the light receiving plane and forms the image formation point. The scan initiation detection means detects the scan initiated point of radiated light on the surface of the measuring object. The processing means corrects and outputs the amount of displacement of the surface of the measuring object based upon the deviation of the image formation position caused because of the dispersion of image formation positions by light passed in the lens array. Further, the processing means is provided with a calibration mode and a measurement mode. In the calibration mode, the deviation of the image formation position caused by the dispersion of image formation positions by light passed in the lens array is respectively detected in plural locations in the scan direction using a reference object. In the measurement mode, the amount of displacement of the measuring object is respectively corrected and output based upon the detected deviation in the plural locations in the scan direction.

Further, a method for measuring displacement according to a fourteenth aspect is based upon a method for measuring displacement for scanning an irradiation point formed by light radiated onto the surface of a measuring object, converging light from the irradiation point by a lens array which is composed of plural condenser lenses having a uniform image formation characteristic around the optical axis and in which the plural condenser lenses are arranged in the scan direction of the radiated light, forming the image formation point on the light receiving plane of the light receiving element and measuring the amount of displacement of the surface of the measuring object without contact based upon the deviation of an image formation position caused because of the dispersion of the positions of image formation points on a light receiving plane, and is characterized in that the deviation of the image formation positions on the light receiving plane of the light receiving element of each point in the scan direction of the surface of the measuring object is detected using a reference object beforehand and the amount of displacement at each point in the scan direction acquired in measuring the measuring object is corrected based upon the deviation.

Also, as described in a fifteenth aspect, the method for measuring displacement according to the fourteenth aspect is characterized in that the radiated light scan position is sequentially detected by counting time from scan initiation time and is used for the detection of the deviation and for correction.

According to the above-mentioned configuration, light that scans the surface of a measuring object is imaged on the light receiving plane of the light receiving element via each condenser lens of the lens array and the amount of displacement in the scan direction can be acquired.

Deviation which each condenser lens has can be detected using a reference object. Deviation detection means stores the deviation of each point in the scan direction in correction value storage means as correction data.

Displacement correction means reads correction data corresponding to the position of a scan from correction value storage means in measuring a measuring object, corrects and outputs the measured amount of displacement referring to the correction data.

Hereby, deviation caused because of the dispersion in fabrication of the lens array and the dispersion of installation states in the equipment is solved by electric processing and high-precision displacement measurement is enabled.

BRIEF DESCRIPTION OF THE DRAWINGS

FIG. 2 is a side view showing the apparatus for measuring displacement according to the invention;

FIG. 3 is a block diagram showing displacement operation means of the apparatus for measuring displacement according to the invention;

FIGS. 4A to 4E are top views respectively showing an image formation point corresponding to the scan of an irradiation point in light receiving means in an embodiment of the invention;

FIG. 18 is a flowchart showing a measurement mode of the measuring object;

DETAILED DESCRIPTION OF THE PREFERRED EMBODIMENTS

Figure 1:
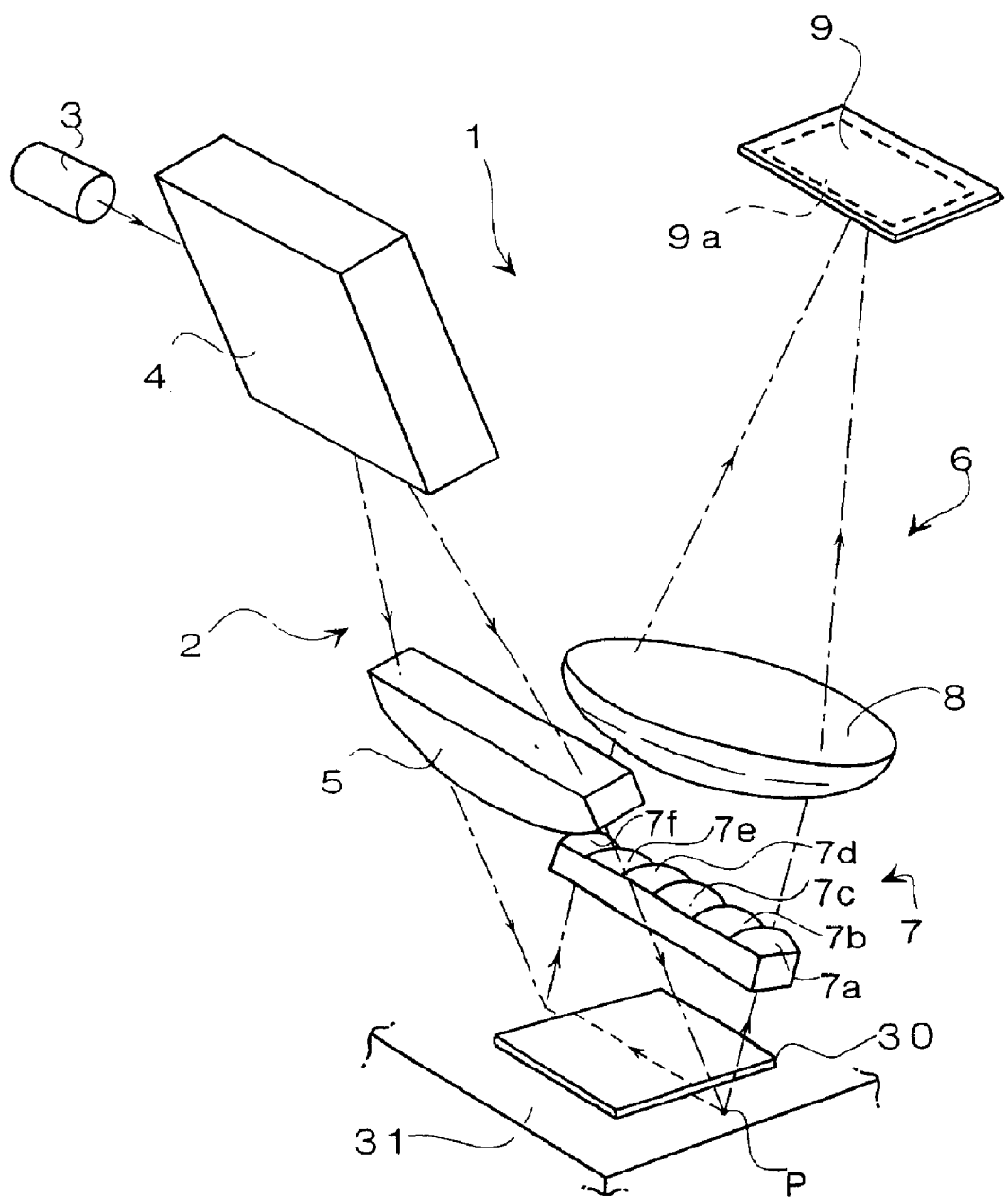
FIG. 1 is a schematic perspective view showing apparatus for measuring displacement according to the invention.

As shown in FIGS. 1 and 2, apparatus for measuring displacement 1 scans a surface 30a of a measuring object with light radiated from projecting means 2 and its light receiving means 6 receives the reflected light. The measuring object 30 is set on a measuring table 31.

The projecting means 2 is composed of a light source 3 such as a laser diode, a deflector 4 such as a rotating mirror type, an oscillating mirror type and a polygon mirror type and a convergent lens 5 for converging light outgoing from the deflector 4 on the surface of the measuring object.

The deflector 4 is arranged in a position in which radiated light is incident on the surface 30*a* of the measuring object from a diagonal direction. The deflector 4 deflects radiated light incident from the light source 3 and scans the radiated light in fixed width.

The convergent lens 5 is arranged on the optical path of light outgoing from the deflector 4 so that the longitudinal direction is matched with the direction of a scan. The convergent lens 5 converges radiated light scanned by the deflector 4 and makes the radiated light parallel to the optical axis incident on the surface 30*a* of the measuring object.

An irradiation point P is formed on the surface of the measuring object by radiated light.

The light receiving means 6 is composed of a lens array 7, an imaging lens 8 having a uniform image formation characteristic around the optical axis and a light receiving element 9. The light receiving means 6 is arranged on the optical path of reflected light.

The lens array 7 is composed of plural (six in FIG. 1) condenser lenses 7*a* to 7*f* lined in the scan direction. Each condenser lens 7*a* to 7*f* is made of synthetic resin or glass and composes the lens array 7. A dimension of width in a direction in which the condenser lenses 7*a* to 7*f* are arranged is shorter than width in which radiated light scans. The focal length f1 (for example, 20 mm) of each condenser lens 7*a* to 7*f* is mutually equal and each optical axis is parallel. Each condenser lens 7*a* to 7*f* has a uniform image formation characteristic around its optical axis. One surface orthogonal to the optical axis of each condenser lens 7*a* to 7*f* is formed so that the surface is spherical.

The imaging lens 8 has a diameter larger than the dimension (for example, 35 mm) of the width of a scan of reflected light. The imaging lens 8 is arranged so that the optical axis and the optical path of reflected light are coincident. The plane of incidence of the imaging lens 8 is opposite to each condenser lens 7*a* to 7*f* and the outgoing plane is opposite to the light receiving plane. The imaging lens 8 uniformly converges reflected light incident on the plane of incidence around the optical axis and images the surface of the measuring object at one point on the light receiving plane 9*a* of the light receiving element 9. The plane of incidence of the imaging lens 8 may be also spherical or aspherical. The place of incidence may be also cut in a shape having only a part corresponding to a range on which reflected light is incident.

The light receiving element 9 is provided with the rectangular light receiving plane 9*a*. The center of the light receiving plane 9*a* intersects the optical axis of the imaging lens 8. The light receiving element 9 is arranged in a position apart by the focal length f2 from the imaging lens 8. Light receiving width w parallel to the scan direction of the light receiving plane 9*a* is set so that the light receiving width is larger than a value acquired by multiplying the width t of each condenser lens 7*a* to 7*f* parallel to the scan direction by the ratio (the magnification) f2/f1 of the focal length f1 of each condenser lens 7*a* to 7*f* and the focal length f2 of the imaging lens 8. For example, when the width in the scan direction of each condenser lens 7*a* to 7*f* is 6 mm and the magnification f2/f1 is 4, the light receiving width w in the scan direction of the light receiving plane 9*a* is larger than 24 mm.

An image (an image formation point K) imaged on the light receiving plane 9*a* moves in a direction orthogonal to the scan direction (hereinafter called the direction of displacement) by the displacement of the surface 30*a* of the measuring object. The direction of displacement has a predetermined gradient shown in FIG. 2 in a horizontal direction to correspond to the movement of an image formation position in the direction of the optical axis of the imaging lens 8 according to the displacement of the surface 30*a* of the measuring object.

An electrode is provided at both ends in the direction of displacement of the light receiving element 9 to output a pair of electric signals A and B corresponding to the position of the image formation point K. When the surface 30*a* of the measuring object approaches the lens array 7, the electric signal A relatively becomes large and the electric signal B becomes small. In the meantime, when the surface 30*a* of the measuring object separates from the lens array 7, the electric signal B relatively becomes large and the electric signal A becomes small.

The electric signals A and B are output to displacement operation means shown in FIG. 3. A pair of current/voltage converters I/V for converting the electric signals A and B from current to voltage is provided to the displacement operation means 10. The electric signals A and B converted in each current/voltage converter I/V are respectively output to an adder 12 and a subtracter 13. In the adder 12, the electric signals A and B are added and an addition signal is output. In the subtracter 13, the electric signal A or B is subtracted from the electric signal B or A and a subtraction signal is output. The addition signal and the subtraction signal are input to a divider 14, division is performed there and a displacement signal D is output.

Next, referring to FIGS. 1 to 5A and 5B, the action of this embodiment will be described. Light radiated from the light source 3 is deflected by the deflector 4 and is scanned at a predetermined stroke. The scanned radiated light is incident on the convergent lens 5 to be parallel beams and forms an irradiation point on the surface 30*a* of the measuring object. The radiated light is reflected or scattered every irradiation point P and reflected or scattered light (measuring beams) is/are outgoing to the side of the light receiving means 6.

As shown in FIG. 4A, the irradiation point P is scanned and radiated light goes to a position opposite to the condenser lens 7*a* at one end of the lens array 7. Light (measuring beams) reflected or scattered from the irradiation point is/are converged by the condenser lens 7*a* to be substantially parallel beams. The converged measuring beams are incident on the imaging lens at an angle with the optical axis of the imaging lens 8.

Figure 5A:
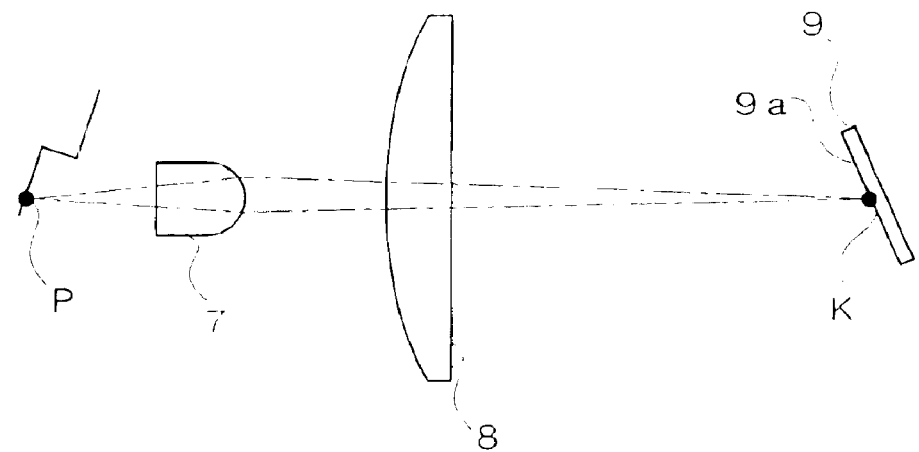
FIGS. 5A and 5B are side views respectively showing an image formation point corresponding to the irradiation point in the light receiving means in the embodiment of the invention.

The imaging lens 8 turns a measuring beam incident on the condenser lens 7*a* and images it on the side of one end of the light receiving plane 9*a* of the light receiving element 9 according to its image formation characteristic. As shown in FIG. 5A, light reflected or scattered from the irradiation point P is also converged by the condenser lenses 7*a* to 7*e* to be substantially parallel when the light is viewed from the side. The light is imaged on the light receiving plane 9*a* of the light receiving element 9 by the imaging lens 8.

Therefore, on the light receiving plane 9*a* of the light receiving element, a dot-shaped image Ka (an image formation point) is formed in a position accurately corresponding to the height of the irradiation point P. Electric signals A and B respectively corresponding to the position are respectively output from the electrode. Measuring beams incident on the other condenser lenses 7b to 7f from the irradiation point P are also converged and are incident on the imaging lens 8. However, these beams are not imaged on the light receiving plane 9a of the light receiving element 9.

As shown in FIG. 4B, the irradiation point P is displaced to a position intersected with the optical axis of the condenser lens 7a of the lens array 7 by the scan of the irradiation point P. Light (measuring beams) reflected or scattered from this irradiation point P is/are converged mainly by the condenser lens 7a to be substantially parallel. The converged measuring beams are incident parallel to the optical axis of the imaging lens 8. Therefore, an image Ka of the irradiation point P is formed in a substantially central position in the direction of the light receiving width of the light receiving plane 9a of the light receiving element 9.

Further, as shown in FIG. 4C, the irradiation point P is displaced near to the condenser lens 7b adjacent to the optical axis in a range opposite to the condenser lens 7a of the lens array 7 by the scan of the irradiation point P. Then, light (measuring beams) reflected or scattered from this irradiation point P is converged mainly by the condenser lens 7a. The measuring beams are incident on the imaging lens at an angle reverse to that in the case shown in FIG. 4A based upon the optical axis of the imaging lens 8. Therefore, the imaging lens 8 forms a dot-shaped image Ka in a position on the side of the other end in the direction of the light receiving width of the light receiving plane 9a of the light receiving element 9.

As described above, when the irradiation point P is displaced in a range opposite to the condenser lens 7a, the image Ka on the light receiving plane 9a of the light receiving element 9 is displaced from the side of one end of the light receiving width of the light receiving plane 9a to the side of the other end.

Figure 5B:
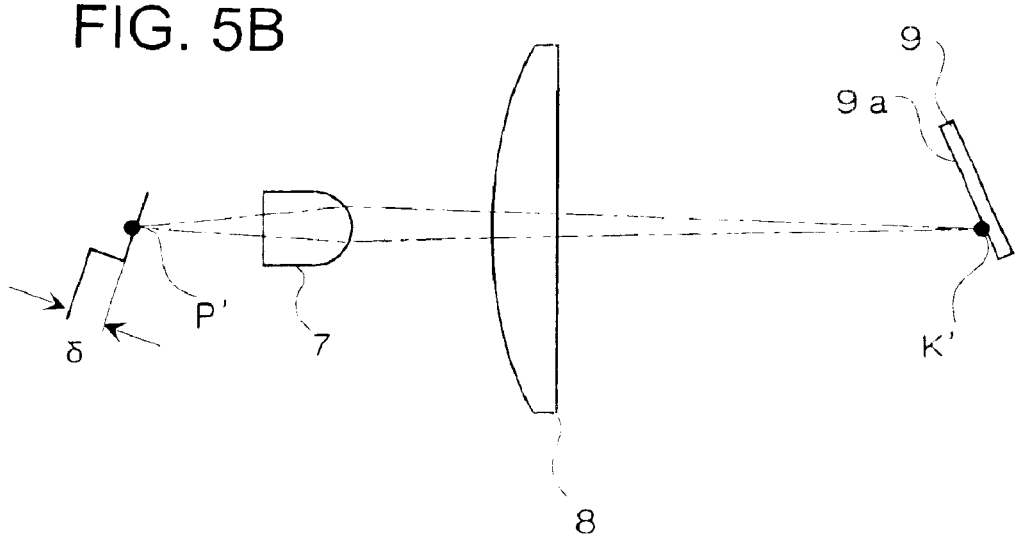

When the irradiation point P is displaced by d in the direction of the height like P' according to the scan of the irradiation point P as shown in FIG. 5B, an image on the light receiving plane 9a of the light receiving element 9 is displaced like K'. Electric signals A and B corresponding to the position are output. The height of the irradiation point P' from a reference level is detected based upon the electric signals A and B and difference δ between the height and the height of the irradiation point P is also detected.

The irradiation point P is displaced to a position opposite to a boundary between the condenser lens 7a and the condenser lens 7b according to the scan of the irradiation point P as shown in FIG. 4D. Measuring from the irradiation point P are converged by the adjacent two condenser lenses 7a and 7b to be substantially parallel beams and are incident on the imaging lens 8. Therefore, image formation points Ka and Kb are formed at both ends in the direction of the light receiving width of the light receiving plane 9a. However, the positions of these two image formation points Ka and Kb in the direction of displacement are equal. Therefore, an electric signal corresponding to the position in the direction of displacement is output from the light receiving element 9 as in a case that an image formation point is one.

When the irradiation point P is further scanned, it is displaced in a range opposite to the condenser lens 7b as shown in FIG. 4E. Then, light (measuring beams) reflected or scattered from the irradiation point P is/are converted mainly by the condenser lens 7b and is/are incident on the imaging lens 8 with the light (the measuring beams) having an angle with the optical axis. The imaging lens 8 forms a dot-shaped image Kb in a position on the side of one end in the direction of the light receiving width of the light receiving plane 9a of the light receiving element 9.

Similarly, while the irradiation point P is scanned in the width in the direction of a scan of the lens array 7 (in this case, 36 mm), the image formation point K is displaced from one end of the light receiving width of the light receiving plane 9a to the other end every condenser lens 7a to 7f. Simultaneously, according to the displacement of the surface 30a of the measuring object 30, the image formation point is displaced in the direction of displacement.

A pair of electric signals A and B accurately corresponding to the displacement in the height of the surface 30a of the measuring object 30 is output to the displacement operation means 10 from the light receiving element 9. The electric signals A and B are respectively converted to voltage by the current/voltage converters I/V as shown in FIG. 3. The converted electric signals A and B are respectively output to the adder 12 and the subtracter 13. After addition and subtraction, an addition signal is output from the adder 12, a subtraction signal is output from the subtracter 13, divider 14 divides the electric signal A by the electric signal B and a displacement signal D is output from the divider 14. The displacement of the surface 30a of the measuring object can be measured based upon the displacement signal D.

The light receiving element 9 the light receiving width w of the light receiving plane 9a of which is small can be used, compared with a conventional type method of converging measuring beams from the irradiation point to be substantially parallel by only the condenser lens having a uniform image formation characteristic around one optical axis the diameter of which is larger than a range in which radiated light scans and making them incident on the imaging lens. That is, it is known that the larger the light receiving width w of this type of light receiving element 9 is, the slower the speed of response is. The light receiving element 9 the light receiving width w of the light receiving plane 9a of which is small and the speed of response of which is fast can be used by configuring so that measuring beams from the irradiation point P are converged by small plural condenser lenses 7a to 7f as in this embodiment. Hereby, the speed of a scan is accelerated, the processing speed for outputting a signal of the light receiving element 9 can be accelerated and measurement time can be reduced.

In this embodiment, the lens array 7 having five condenser lenses 7a to 7e is used for the range of a scan of 36 mm by a beam, however, the invention is not limited to this. If the condenser lenses 7a to 7e are further miniaturized (for example, the width is 2 mm), the light receiving width w of the light receiving plane 9a of the light receiving element 9 can be further reduced and the processing speed for an electric signal output from the light receiving element 9 can be further accelerated.

If the ratio f2/f1 of the focal length f1 of each condenser lens 7a to 7e and the focal length f2 of the imaging lens 8 is reduced, the length in the direction of displacement of the light receiving element 9 can be also reduced. In the meantime, when the focal length f2 of the imaging lens 8 is reduced, aberration is increased in the periphery of the imaging lens 8. When the focal length f1 is increased in a state that the width of each condenser lens 7a to 7e is fixed, the condenser lenses 7a to 7e become dark and the amount of received light decreases. Therefore, the outside diameter and the focal length of each lens 7 and 8 may be determined according to a state of the surface of the measuring object 30 and precision required for measurement.

For the lens array 7 in this embodiment, the plural condenser lenses 7a to 7e are integrated by synthetic resin or glass. However plural condenser lenses 7a to 7e individually formed may be also bonded and integrated and each condenser lens 7a to 7e may be also lined in a state without clearance without bonding.

In this embodiment, for the imaging lens 8, a lens one plane of which is spherical is used, however, it has only to be an imaging lens which can uniformly converge beams around its optical axis and a lens both planes of which are spherical or aspherical may be also used.

Second Embodiment

Figure 6:
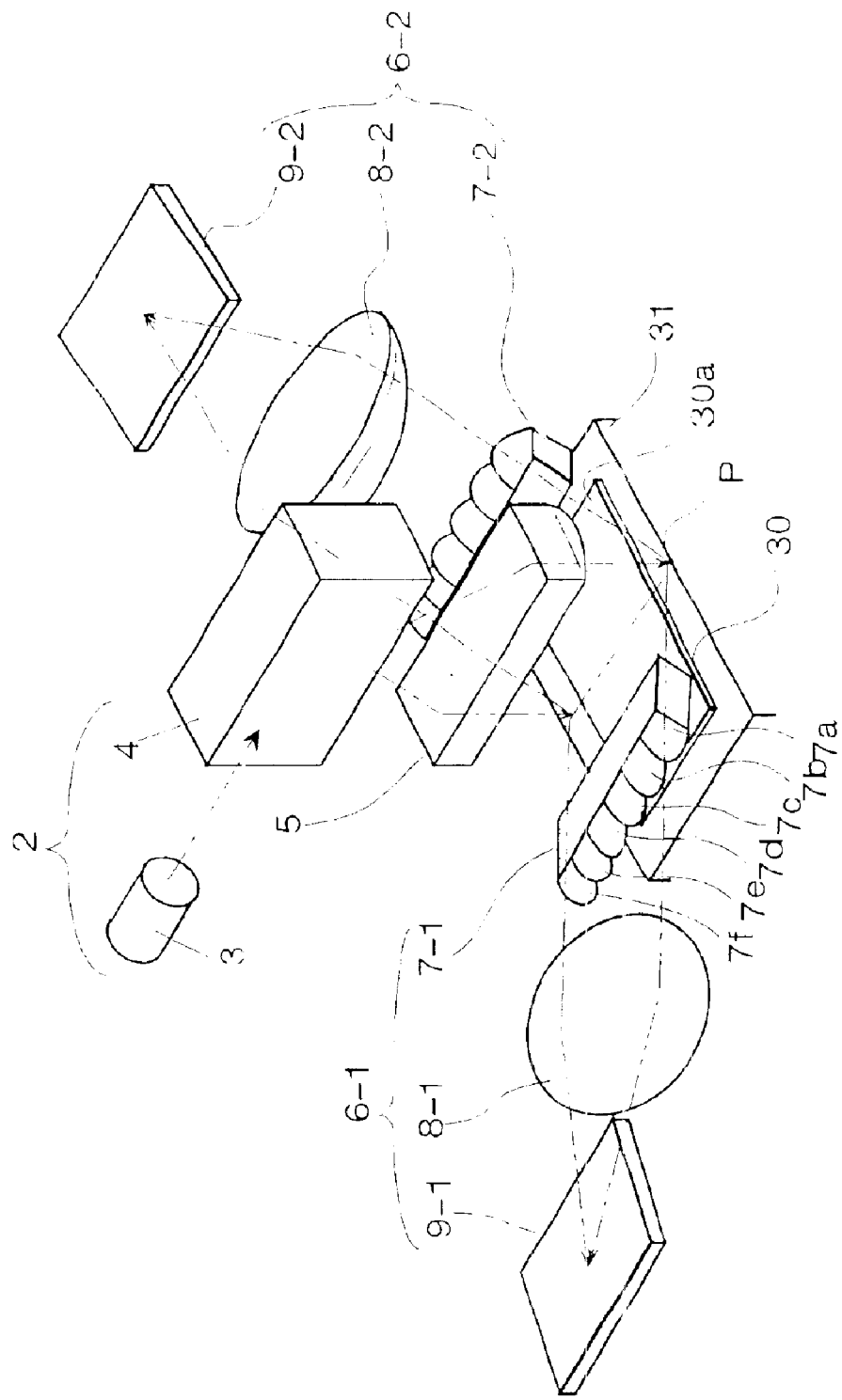
FIG. 6 is a schematic perspective view showing apparatus for measuring displacement equivalent to a second embodiment of the invention.
Figure 7:
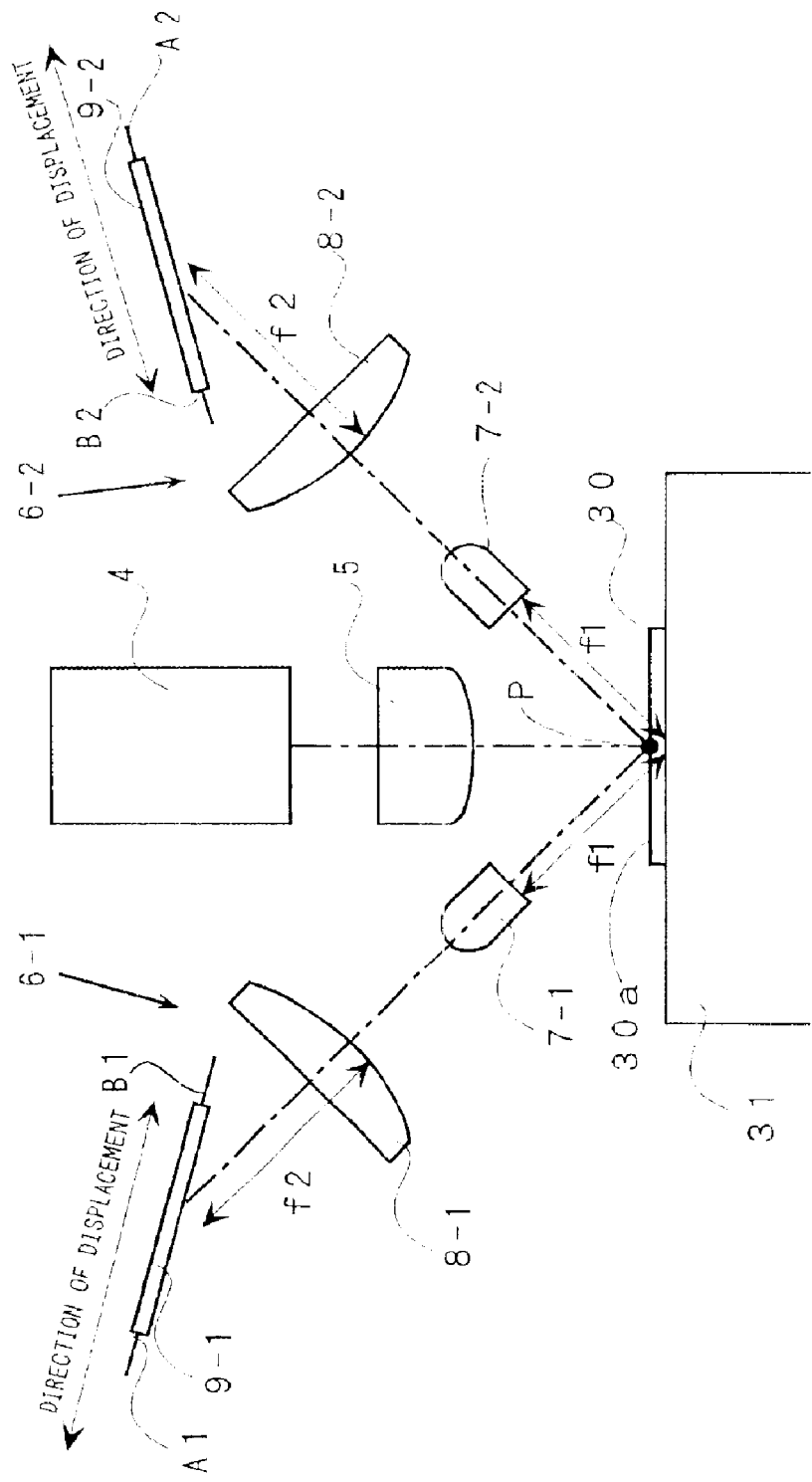
FIG. 7 is a side view showing the apparatus for measuring displacement equivalent to the second embodiment of the invention.

This embodiment is an example in which the projecting means 2 in the first embodiment is arranged in a position that light radiated from the projecting means is vertically incident on the surface 30a of a measuring object and a pair of light receiving means 6 (6-1, 6-2) is provided in positions symmetrical with the optical path plane of scanned radiated light so that measuring beams scattered at an irradiation point P can be received as shown in FIGS. 6 and 7. The description of the configuration and functions respectively common to those in the first embodiment is omitted below.

Figure 8:
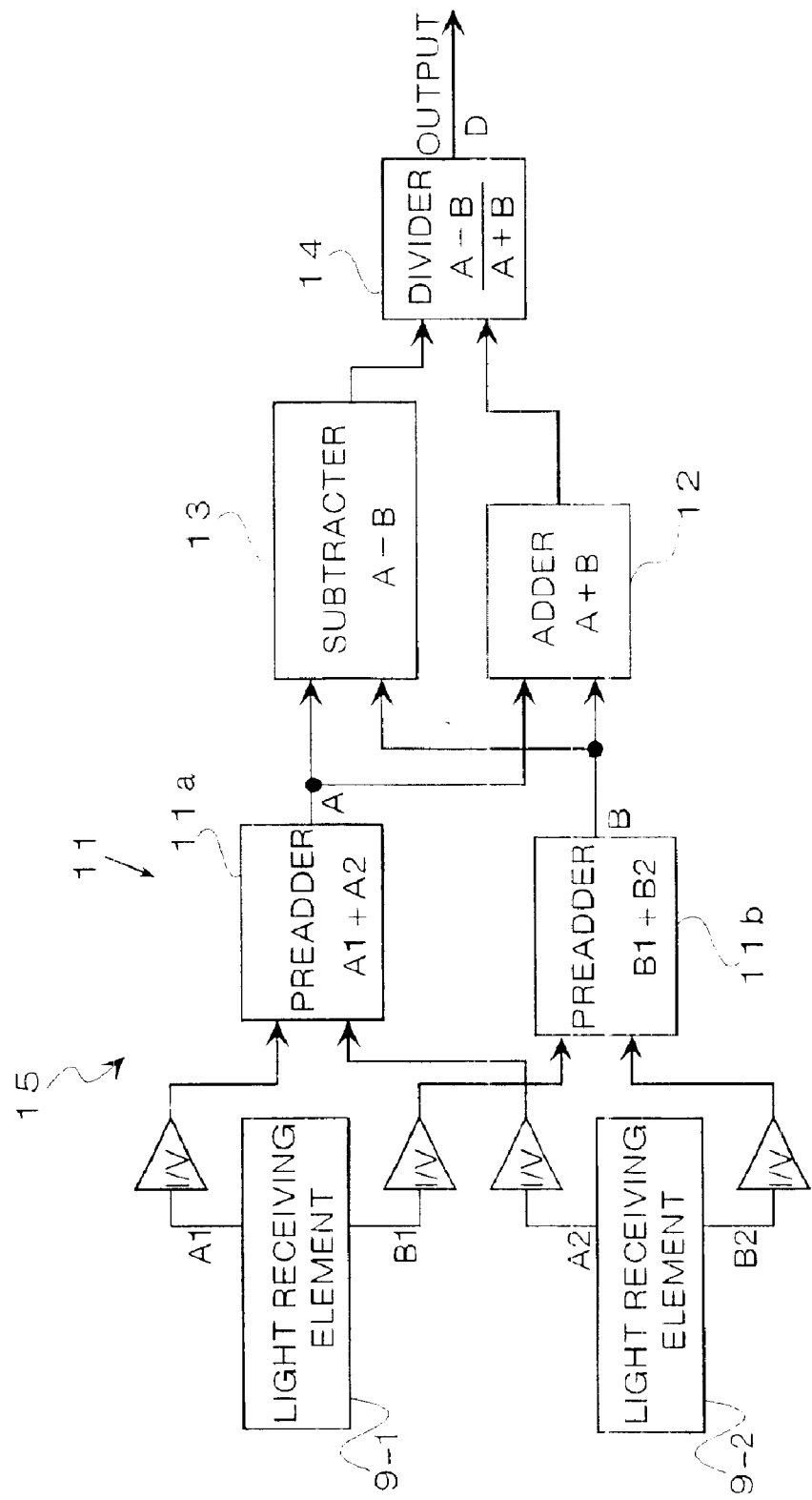
FIG. 8 is a block diagram showing displacement operation means of the apparatus for measuring displacement equivalent to the second embodiment of the invention.

FIG. 8 is a block diagram showing electric configuration (displacement operation means 15) that operates the displacement of a measuring object 30 based upon the output of a pair of light receiving elements 9 (9-1, 9-2).

This displacement operation means 15 is provided with a current-voltage converter I/V, a preadder 11, an adder 12, a subtracter 13 and a divider 14. The preadder 11 is configured by connecting a first preadder 11a and a second preadder 11b for converting an input electric signal to voltage in parallel every light receiving element 9-1, 9-2. The adder 12 adds an electric signal A from the preadder 11a and an electric signal B from the preadder 11b. The subtracter 13 subtracts the electric signal B from the electric signal A. The divider 14 divides a signal output from the adder 12 or the subtracter 13 by a signal output from the subtracter 13 or the adder 12. The result of the division is output as a displacement signal D.

Figure 9:
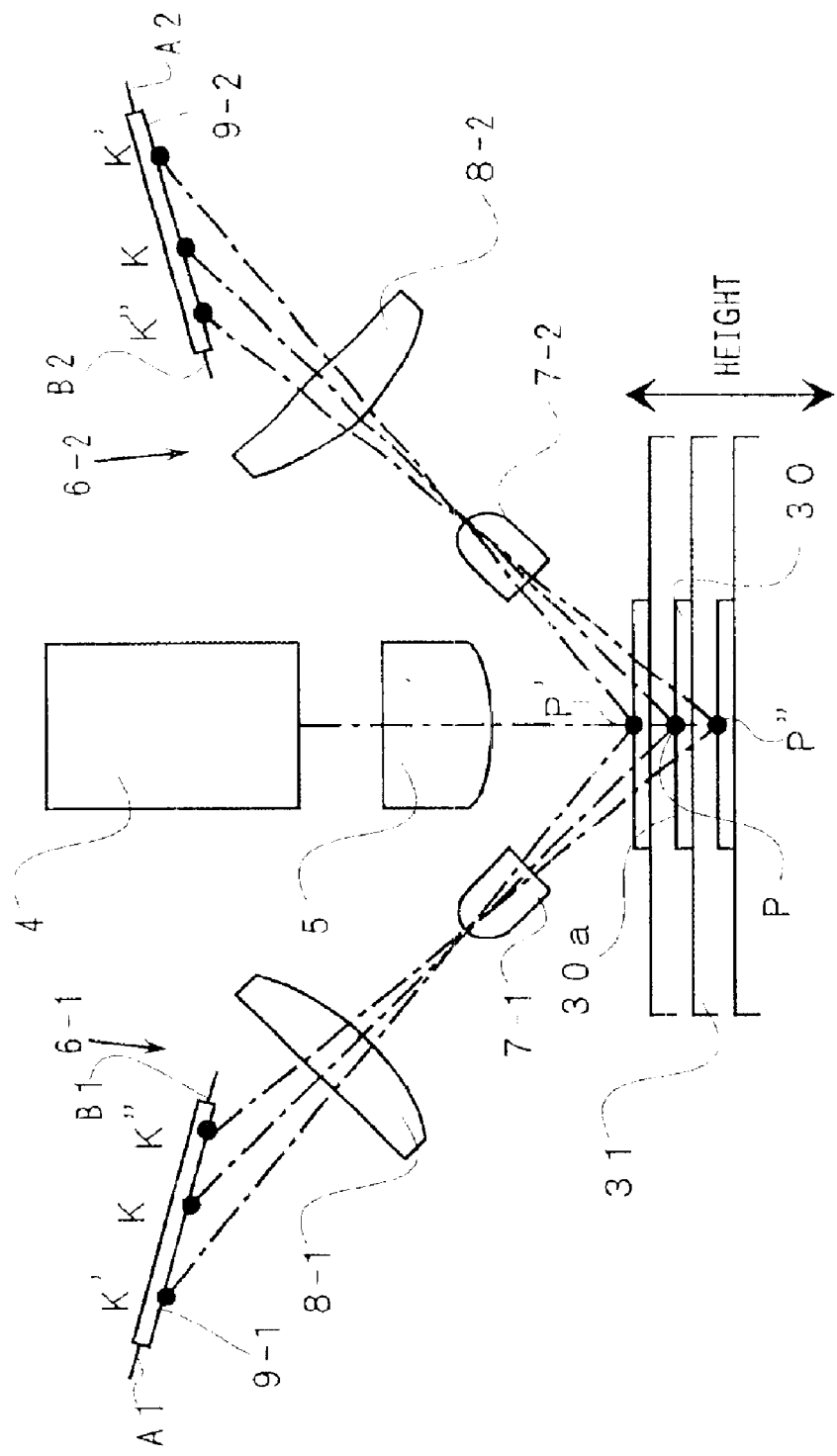
FIG. 9 is a side view showing the operation of the apparatus for measuring displacement equivalent to the second embodiment of the invention.

Next referring to FIGS. 8 through 10, the action of this embodiment will be described. Light radiated from a light source 3 is deflected by a deflector 4 and is scanned at a predetermined stroke. The scanned radiated light is converged via a convergent lens 5, is vertically incident on the surface 30a of the measuring object 30 on a measuring table 31 and forms an irradiation point P on the surface 30a of the measuring object. Radiated light is scattered from the irradiation point P because the surface 30a of the measuring object is not a mirror finished surface. Scattered light (measuring beams) scattered at the irradiation point P is/are converged by both lens arrays 7 (7-1, 7-2), is/are converged around the optical axis by both imaging lenses 8 (8-1, 8-2) and forms/form an image formation point K on both light receiving planes 9a.

The image formation point K formed on both light receiving planes 9a is formed in positions symmetrical with the optical path plane of scanned radiated light. For example, as shown in FIG. 9, when the surface 30a of the measuring object is displaced in the direction of the height and the irradiation point goes to the position of P', the image formation point both goes to the position of K'. When the surface 30a of the measuring object is displaced in the direction of the height and the irradiation point goes to the position of P'', the image formation point both goes to the position of K''.

A pair of electric signals (A1, B1) and (A2, B2) accurately corresponding to the displacement of the height of the surface 30a of the measuring object 30 is respectively output from each light receiving element 9 (9-1, 9-2). The displacement of each surface 30a of the measuring object can be measured based upon these electric signals.

Figure 10:
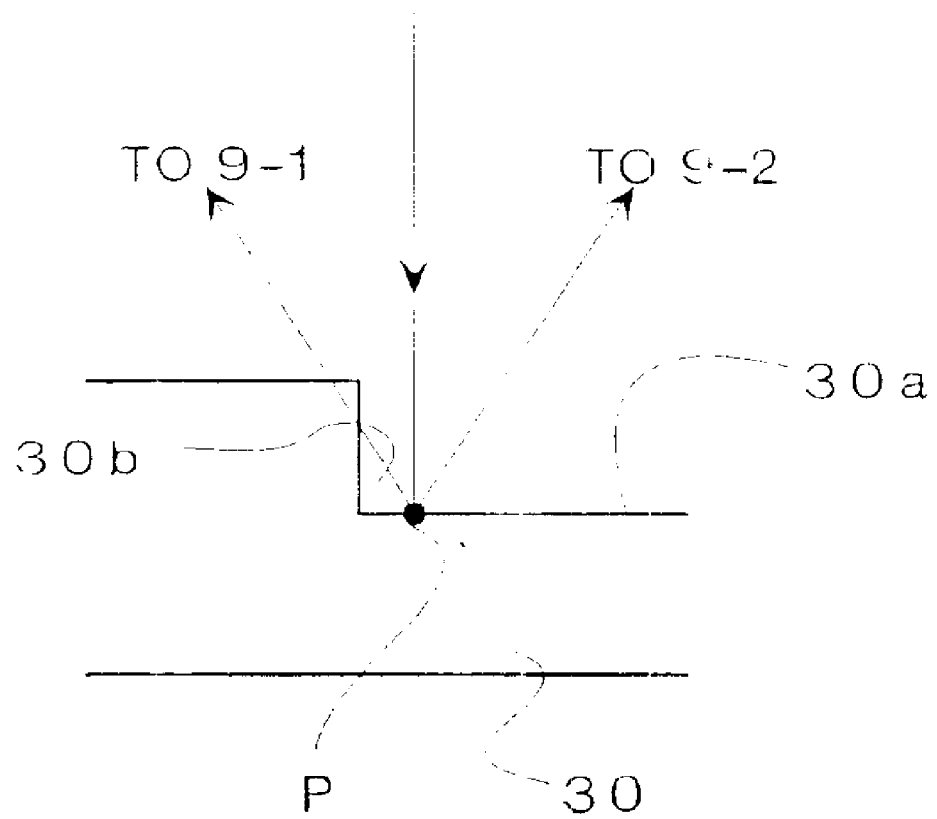
FIG. 10 is a side view showing a state in which scattered light is intercepted in case there is difference in a level in the vicinity of an irradiation point on a measuring object.

As shown in a side view in FIG. 10, in case the irradiation point P is located in the vicinity of part having difference in a level 30b formed on the surface 30a of the measuring object a measuring beam to be scattered in the direction of one light receiving element 9-1 (shown by a dotted line in FIG. 10) is intercepted by the side of a convex portion. In this case, no electric signal (A1, B1) corresponding to the displacement in the height of the surface 30a of the measuring object is output from one light receiving element 9-1 on which no image is imaged by interception.

However the image K of the irradiation point P is imaged on the other light receiving element 9-2 as described above. The electric signal (A2, B2) accurately corresponding to the displacement in the height of the surface 30a of the measuring object 30 is output. The displacement of each surface 30a of the measuring object can be measured based upon the electric signal.

The electric signals (A1, B1), (A2, B2) output as described above are processed as follows. As shown in FIG. 8, electric signals A1 and A2 respectively converted to voltage are respectively input to the first preadder 11a. Electric signals B1 and B2 respectively converted to voltage are input to the second preadder 11b.

In the first preadder 11a, the electric signals A1 and A2 are added, in the second preadder 11b, the electric signals B1 and B2 are added and they are respectively output to the adder 12 and the subtracter 13 as electric signals A and B.

A value A+B added by the adder 12 and a value A−B subtracted by the subtracter 13 are output to the divider 14. An expression (A−B)/(A+B) is calculated in the divider 14, and is output as a displacement signal D.

As shown in FIG. 10, in case the irradiation point P is located in the vicinity of the part having difference in a level 30b of the surface 30a of the measuring object and no image is imaged on one light receiving element 9-1, no electric signals A1, B1 are output from the one light receiving element 9-1 for example. In this case, after only electric signals A2 and B2 are converted to voltage, the preadder 11 outputs them as electric signals A and B. The output signals A and B are input to the adder 12 and the subtracter 13 and they respectively calculate A2+B2 and A2−B2. The divider 14 calculates an expression (A2−B2)/(A2+B2). The result of the division can be output a displacement signal D. As described above, as the divider 14 divides output acquired by addition (A2+B2) and by subtraction (A2−B2), the precise output of displacement can be acquired without being influenced by the variation of the amount of received light.

As according to the displacement operation means 15 configured as described above, the operation of displacement is executed after addition and subtraction are performed after output signals (electric signals) from each light receiving element 9-1, 9-2 are added beforehand, plural disorders 14 are not required and the cost can be reduced.

Figure 11:
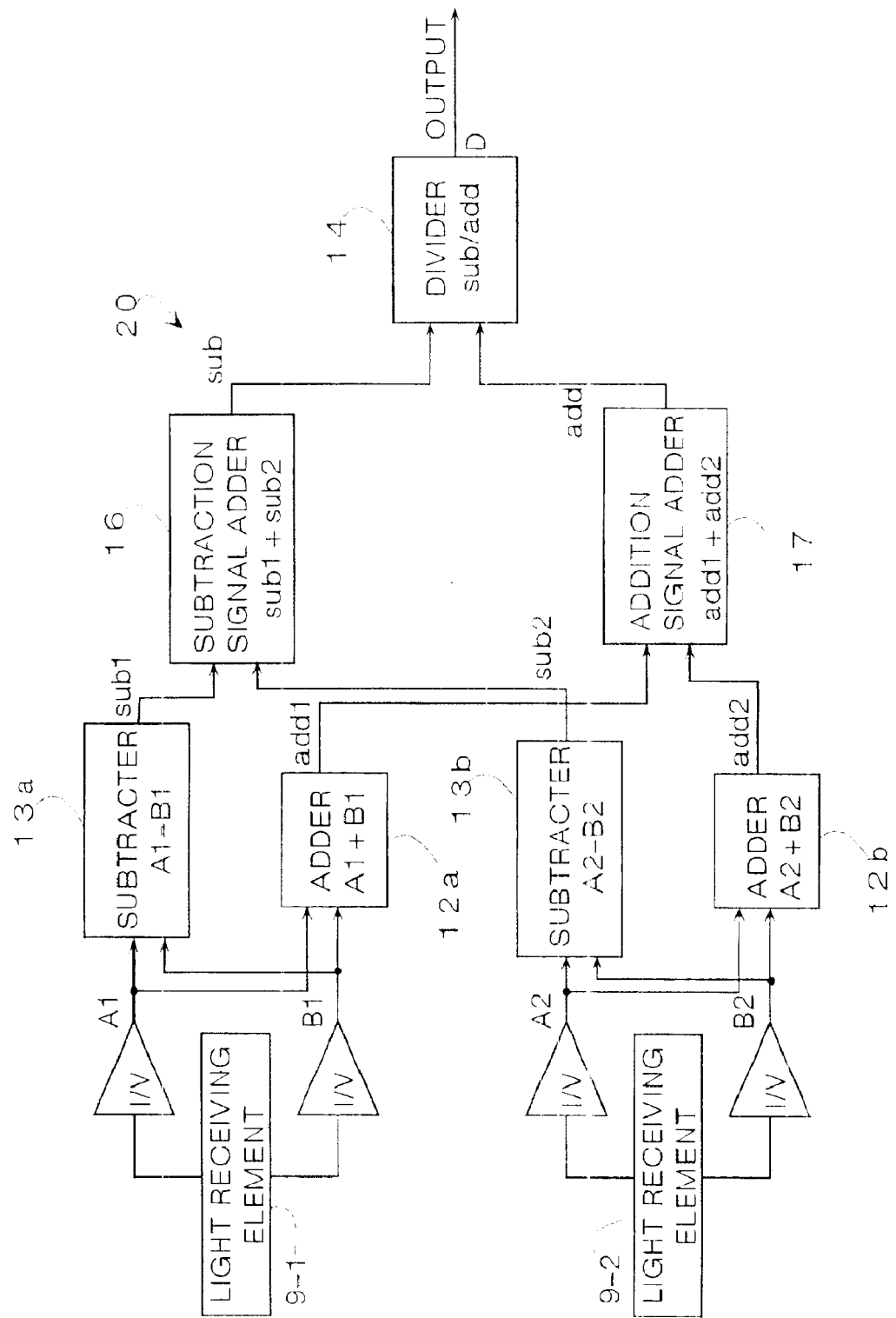
FIG. 11 is a block diagram showing another displacement operation means in the second embodiment of the invention.

The above-mentioned displacement operation means 15 executes the operation of displacement after the means adds output signals (electric signals) from each light receiving element 9-1, 9-2. However, as shown in FIG. 11, the operation of displacement may be also executed every output signal from each light receiving element 9-1, 9-2. Concretely, the adder 12 and the subtracter 13 respectively included in the displacement operation means 15 are provided every light receiving means 6-1, 6-2.

A subtraction signal sub1 output from a first subtracter 13a and a subtraction signal sub2 output from a second subtracter 13b are both output to a subtraction signal adder 16. In the meantime, an addition signal add1 output from a first adder 12a and an addition signal add2 output from a second adder 12b are both output to an addition signal adder 17.

The subtraction signal adder 16 adds the subtraction signals sub1 and sub2 and outputs an electric signal sub showing the sum. The addition signal adder 17 adds the addition signals add1 and add2 and outputs an electric signal add showing the sum.

Both electric signals sub and add are input to a divider 14. The electric signal sub is divided by the electric signal add. The divider 14 outputs a displacement signal D as a result of division.

The individual addition signals and individual subtraction signals are respectively added according to displacement operation means 20 shown in FIG. 11 even if the sensitivity and others of both light receiving means 6-1 and 6-2 are unbalanced. Therefore, the gain control and others of a current-voltage converter can be facilitated and displacement measurement precisian can be enhanced.

Further, the above-mentioned displacement operation means 15 executes the operation of displacement after the means adds the corresponding output signals (electric signals) from each light receiving element 9-1, 9-2, however, as shown in FIG. 11, the operation of displacement may be also executed every output signal from each light receiving element 9-1, 9-2. Concretely, the adder, the subtracter and the divider respectively shown in the displacement operation means 15 are provided every light receiving means 6-1, 6-2.

In displacement operation means 25, addition signals L1 (A1+B1) and L2 (A2+B2) in each adder 12 are respectively input to level determination means 21 and it is discriminated there whether the data L1 and L2 respectively reach to a predetermined reference value or not. When it is determined that the data reaches to the reference value, the result of determination is input to a decoder 22 which is selecting means.

In case the result of the determination tells that only the addition signal L1 reaches to the reference value, a signal to output a displacement signal D1 ((A1−B1)/(A1+B1)) on the side of one light receiving element 9-1 is output to switching means 23 and a switch S1 is selected. Hereby, the displacement signal D1 is output.

In the meantime, in case the result of the determination tells that only the addition signal L2 reaches to the reference value, a signal to output a displacement signal D2 ((A2−B2)/(A2+B2)) on the side of the other light receiving element 9-2 is output from the decoder 22 to the switching means 23 and a switch S2 is selected. Hereby, the displacement signal D2 is output.

In case the result of the determination tells that both the addition signals L1 and L2 reach to the reference value, a signal to output the average value D3 of the displacement signals D1 and D2 of each light receiving element 9-1, 9-2 is output from the decoder 22 to the switching means 23 and a switch S3 is selected. Hereby, an average value D3 which is a result of equalizing processing by equalizing means 24 is output.

In case both the addition signals L1 and L2 do not reach to the reference value, the decoder 22 outputs an alarm signal telling that measurement is disabled to an external device and the output of displacement has a predetermined fixed value.

Figure 12:
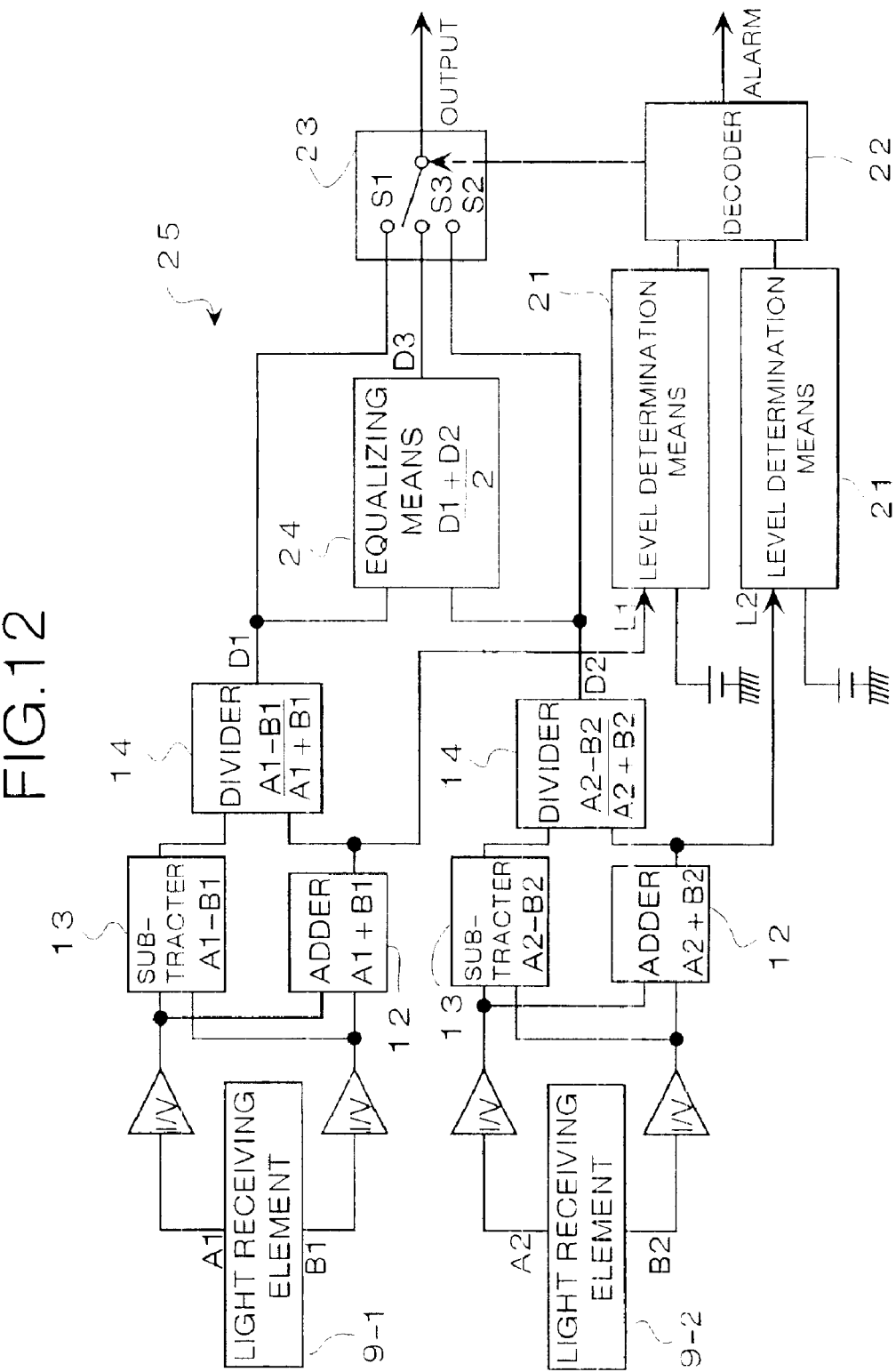
FIG. 12 is a block diagram showing the other displacement operation means in the second embodiment of the invention.

The displacement operation means 25 shown in FIG. 12 is provided with the adder 12 and a subtracter 13 every light receiving element 9-1, 9-2 to prevent noise from increasing, to acquire satisfactory signal-to-noise ratio and to enhance displacement measurement precision. Particularly, even if light is incident on only one light receiving element or sufficient quantity of light is not incident, predetermined precision can be acquired.

Third Embodiment

A third embodiment of the invention will be described below. The basic optical system of apparatus for measuring displacement equivalent to this embodiment may be the same as that in the first embodiment or in the second embodiment. As shown in FIG. 1, for a measuring object 30 loaded on a measuring table 31, there are a reference object 30A such as a block gage which is set when the equipment is in a calibration mode and the surface 30a to be measured of which is a flat reference surface and a measuring object 30B set in a measurement mode.

Figure 13:
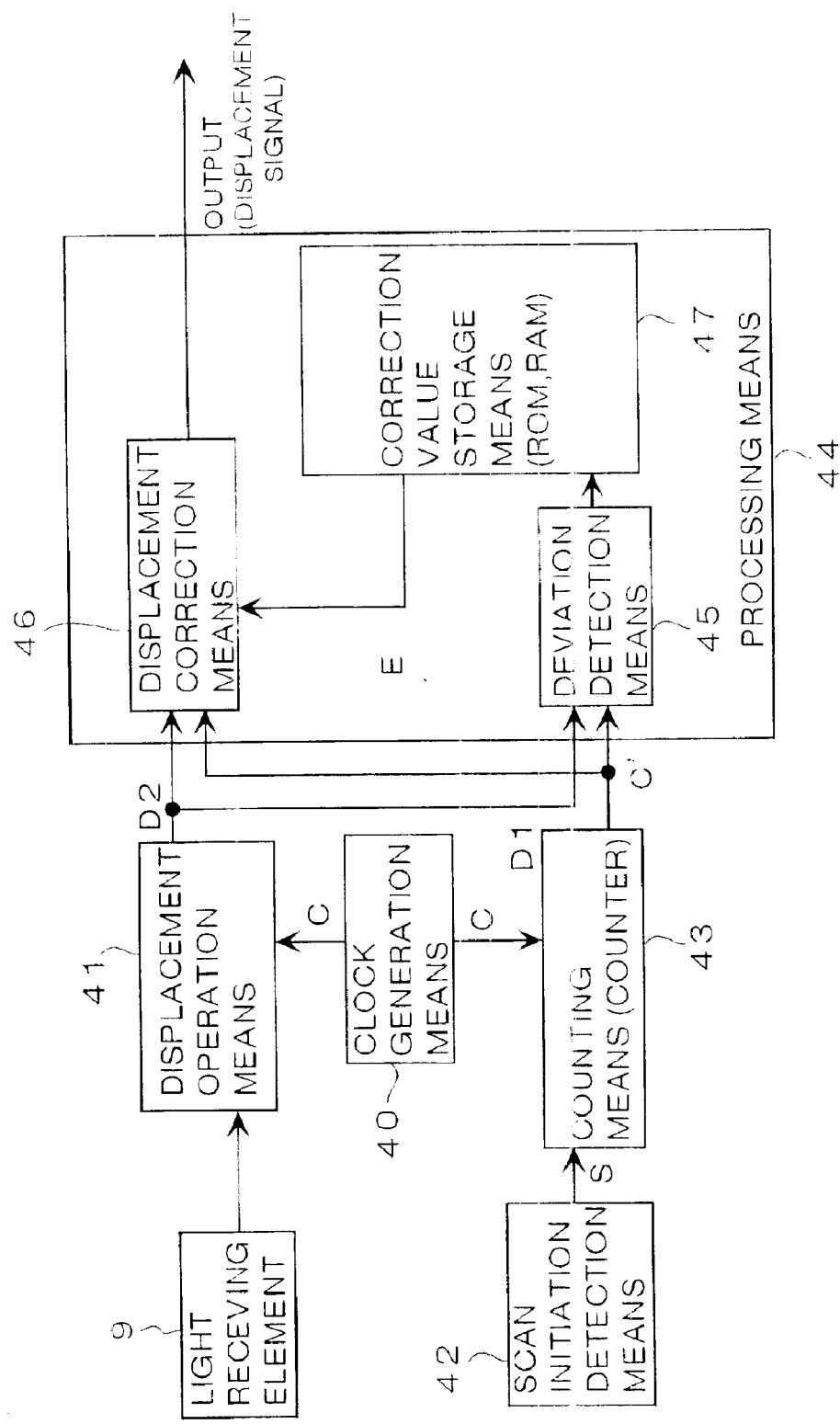
FIG. 13 is a block diagram showing the electric configuration of the apparatus for measuring displacement.

FIG. 13 is a block diagram showing the electric configuration for calibrating an error caused in a lens array 7 of the apparatus for measuring displacement. Displacement operation means 14 shown in FIG. 13 is the same as that 10, 15, 20 and 25 in the first embodiment and in the second embodiment. This displacement operation means 41 is operated according to a clock pulse C supplied from clock generation means 40 and outputs a displacement signal D showing the amount of displacement of the measuring object 30 based upon the output of a light receiving element 9. For displacement operation processing in the displacement operation means 41, after electric signals A and B output from both electrodes of the light receiving element 9 are converted to voltage, they are added or subtracted. A value acquired by dividing a subtracted signal value by an added signal value is output to processing means 44 as a displacement, signal D (D1, D2).

Scan initiation detection means 42 outputs a single scan initiation pulse S to counting means 43 every time the scan of radiated light incident from a light source 3 is initiated.

The counting means 43 is composed of a counter, and a clock pulse C and a scan initiation pulse S are input. The counting means 43 outputs a count value as a count pulse C' according to a clock pulse C every time a scan initiation pulse S is input.

The processing means 44 detects the deviation of an image formation position caused because of the dispersion of image formation positions by light passed in the lens array 7 in plural locations in the direction of a scan. The processing means corrects the amount of displacement of the surface of the measuring object based upon the detected deviation and outputs it. The processing means 44 includes deviation detection means 45, displacement correction means 46 and correction value storage means 47.

The deviation detection means 45 is operated when the equipment is in a calibration mode and executes calibration processing. A signal showing the displacement of the surface 30a of the reference object 30A having a smooth surface the contour of which is known beforehand (hereinafter called a displacement signal for correction) D1 and a count pulse C' from the counting means 43 are input to the displacement operation means 41. The deviation detection means 45 stores the displacement 'signal' for correction D1 in the correction value storage means 47 correlating with a count pulse C'. Hereby, the value of a displacement signal for correction D1 in each measuring position when the measuring object 30B is scanned is stored corresponding to a count pulse.

The correction value storage means 47 is composed of ROM and RAM. For example, a displacement signal for calibration D1 is stored in a table at an address corresponding to a count pulse C' of erasable ROM. In a measurement mode described later, reading can be accelerated by transferring the contents stored in ROM to RAM beforehand.

The displacement correction means 46 is operated in a measurement mode and outputs a corrected displacement signal. A signal showing the displacement of the surface 30a of the measuring object 30B (hereinafter called a displacement signal for measurement) D2 from the displacement operation means 41 and a count pulse C' from the counting means 43 are input to the displacement correction means 46. The displacement signal for calibration D1 output by the displacement operation means 41 and this displacement signal for measurement D2 have the same signal format and in this embodiment, for convenience, a different name is allocated every mode.

The displacement correction means 46 reads a displacement signal for correction D1 (data for correction E) stored at the corresponding address of the correction value storage means 47 (RAM) based upon a count pulse C' from the counting means 43. The displacement correction means 46 outputs a displacement signal corrected by correcting operation processing based upon a displacement signal for measurement D2 input from the displacement operation means 41 and the data for correction E. This correcting operation processing means processing for subtracting the data for correction E from the displacement signal for measurement D2.

Figure 14:
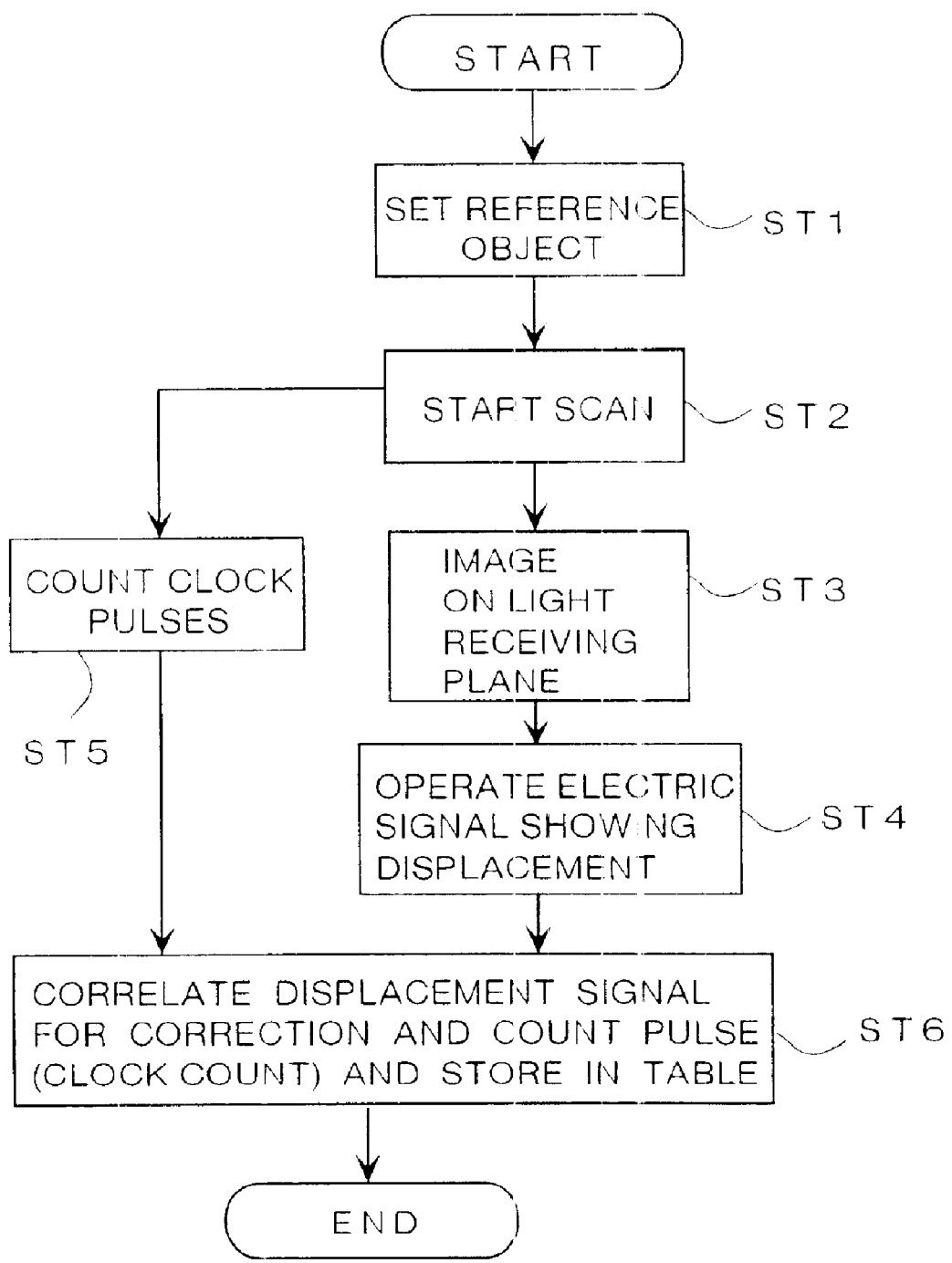
FIG. 14 is a flowchart showing a calibration mode of the apparatus for measuring displacement according to the invention.

Next, the operation of the equipment configured as described above will be described every mode. FIG. 14 is a flowchart showing the contents of processing in a calibration mode.

Figure 15:
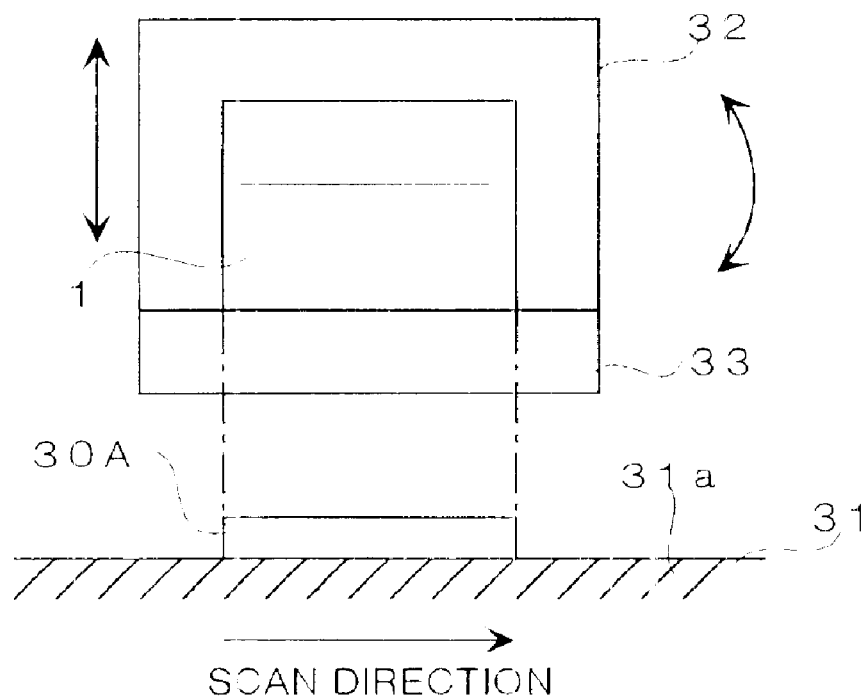
FIG. 15 is a front view showing a state in the calibration mode in which the equipment is installed.
Figure 16:
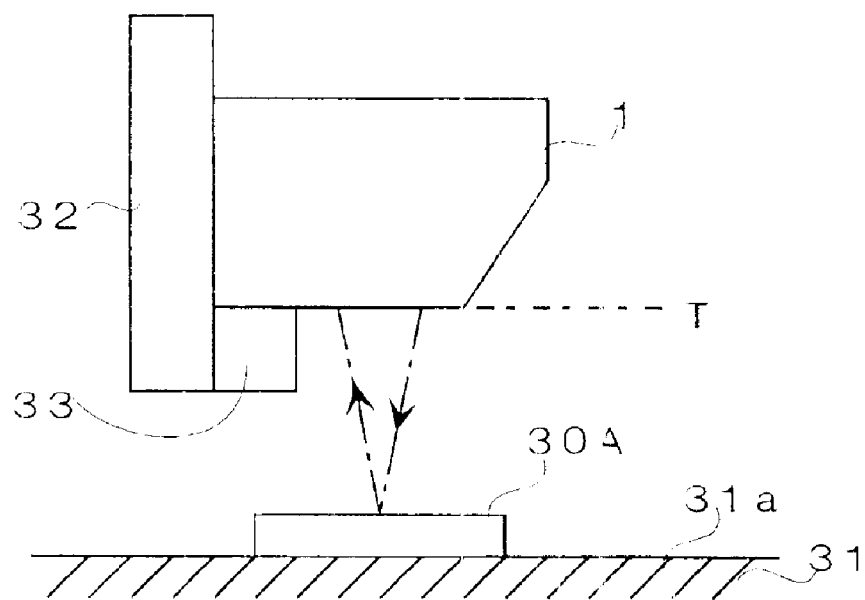
FIG. 16 is the side view.

In the calibration mode, first, the apparatus for measuring displacement 1 and the reference object 30A are set and adjusted by a correcting jig 32 (ST1). FIG. 15 is a front view showing a state of the equipment in the calibration mode and FIG. 16 is the side view.

The correcting jig 32 is provided with a butt plate 33 so that a datum clamp face T is horizontal. The butt plate 33 is adjusted so that the datum clamp face T is parallel to the surface 31a of the measuring table 31. The reference object 30A is set on the measuring table 31. At this time, the apparatus for measuring displacement 1 is adjusted upward or downward so that the surface 30a of the reference object 30A can be measured.

Next, the apparatus for measuring displacement 1 is operated in the calibration mode. Light radiated from the light source 3 is deflected by a deflector 4 so that the light is incident on the surface 30a of the reference object 30A (ST2). At this time, the scan initiation, detection means 42 outputs a scan initiation signal S to the counting means 43 every time the deflection (scanning) of radiated light is started.

When an irradiation point P is linearly scanned on the surface 30a of the reference object 30A, radiated light is regularly reflected toward light receiving means 6 at the same angle as the angle of incidence and is incident on the lens array 7.

As the lens array 7 is the aggregate of plural condenser lenses 7a to 7f having a uniform image formation characteristic around the optical axis, reflected light from each irradiation point P is converged in parallel, is further converged by an imaging lens 8 and is imaged on a light receiving plane 9a (ST3).

Figure 17:
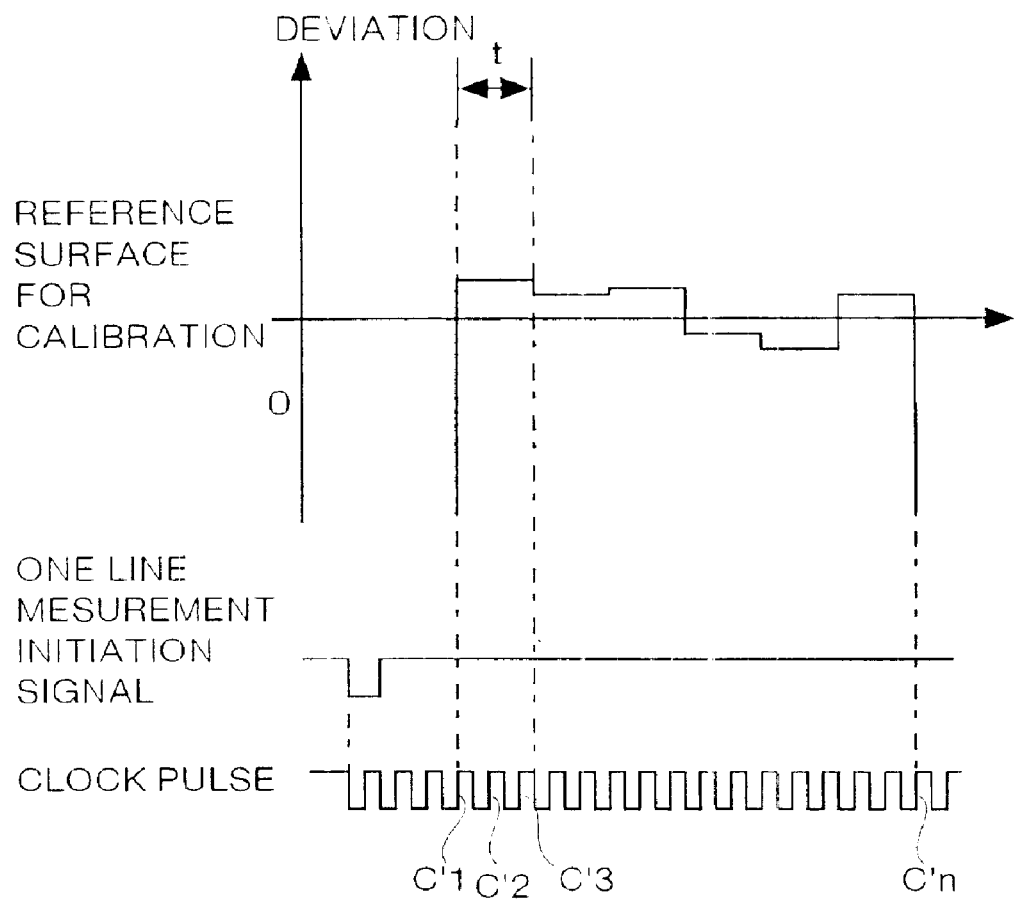
FIG. 17 shows deviation detected in the calibration mode of the apparatus for measuring displacement according to the invention.

As the surface 30a of the reference object 30A is flat, an irradiation point P in any position on the surface 30a is to be imaged in position determined in the direction of displacement on the light receiving plane 9a. However, actually, displacement acquired from an image formation point K includes deviation shown in FIG. 17.

This deviation is caused because the focal length f1 is different every condenser lens 7a to 7f of the lens array 7 and because of the dispersion of positions and directions in which condenser lenses in the lens array 7 are set in assembly. "t" is equivalent to time required for passage in the width of each condenser lens 7a to 7f in scanning.

Electric signals A and B corresponding to this deviation are input from electrodes provided at both ends of the light receiving element 9 to the displacement operation means 41, displacement operation processing is executed and a displacement signal for calibration D1 is output to the deviation detection means 45 (ST4).

In the meantime, when a scan initiation signal S and a clock pulse C are input to the counting means 43, clock pulses are counted since the scan initiation signal S is input (ST5). This count pulse C' is output to the deviation detection means 45.

The count pulse C' is input to the deviation detection means 45 and is correlated with a displacement signal for calibration D1 every clock pulse C'1 to C'n. That is, a displacement signal for calibration D1 of each irradiation point P is stored in a table the address of which corresponds to a count value in the correction value storage means 47 (ST6). In the correction value storage means 47, a displacement signal for calibration D1 of each irradiation point P is stored at each address. This displacement signal for calibration D1 has a value equivalent to the above-mentioned deviation.

In scanning radiated light, time when radiated light passes in each condenser lens 7a to 7f of the lens array 7 is preset based upon clock pulses C since a scan initiation signal S is input.

Next, FIG. 18 is a flowchart showing the contents of processing in a measurement mode. First, the measuring object 30B to be measured is set on the measuring table 31 LOT?). Next, measurement by the apparatus for measuring displacement 1 is started. In both the above-mentioned calibration mode and the measurement mode, the operation of an optical system of the apparatus for measuring displacement 1 is similar and the displacement operation means 41 executes the similar displacement operation processing.

That is, light is radiated from the light source 3, the radiated light deflected by the deflector 4 is incident on the surface 30a of the measuring object 30B set on the measuring table 31 and an irradiation point P is linearly scanned (ST8).

At this time, the scan initiation detection means 42 outputs a scan initiation signal S to the counting means 43 every time a scan by light radiated from the light source 3 is started.

An irradiation point P by the deflection of radiated light is scanned on the surface 30a of the measuring object 30B. This radiated light is reflected on the surface 30a, is converged by the lens array 7, is further converged by the imaging lens 8 and is imaged on the light receiving plane of the light receiving element 9 (ST9). In measuring, displacement acquired from the position of an image formation point K also includes an error caused by the lens array 7 (deviation measured on the surface 30a of the reference object 30A).

Figure 19A:
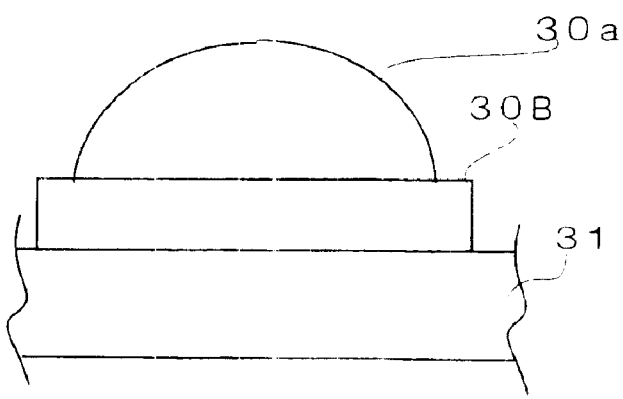
FIGS. 19A to 19C are explanatory drawings for explaining processing for solving deviation caused in a lens array.
Figure 19B:
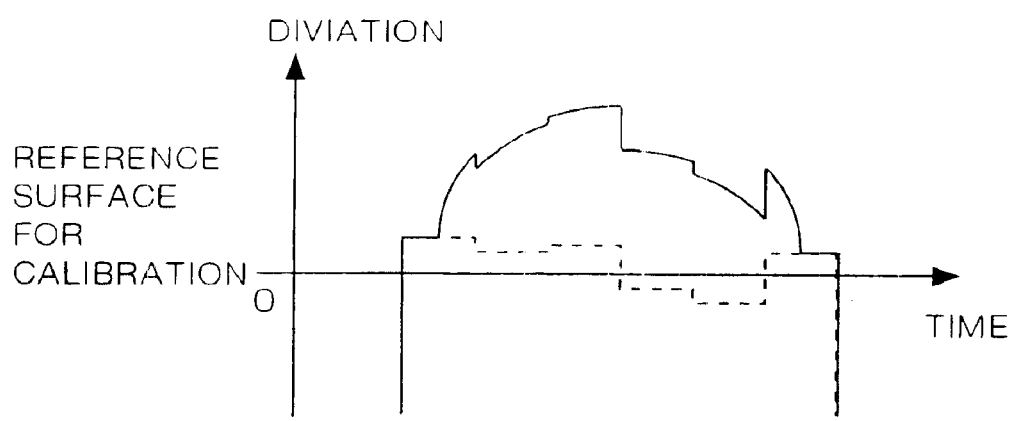
Figure 19C:
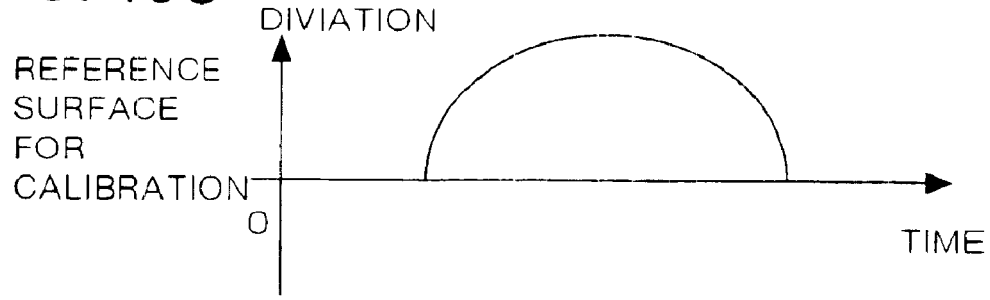
Figure 20:
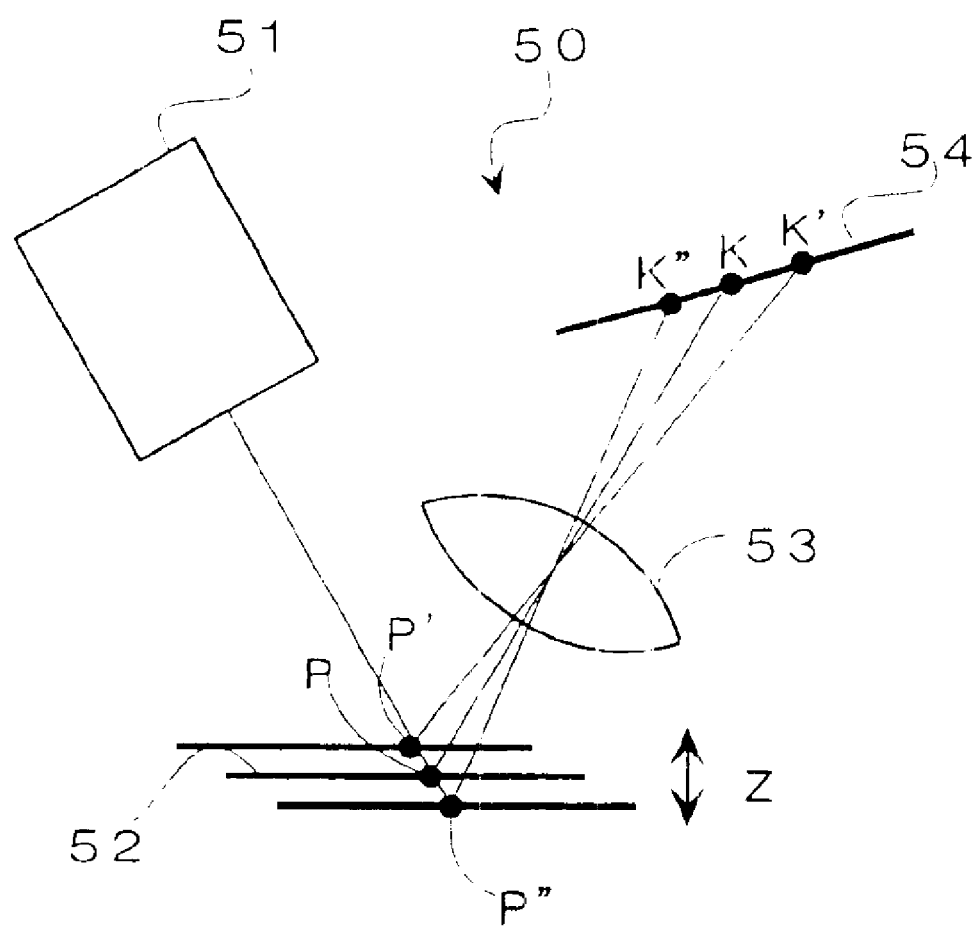
FIG. 20 is a schematic drawing showing conventional type apparatus for measuring displacement.
Figure 21:
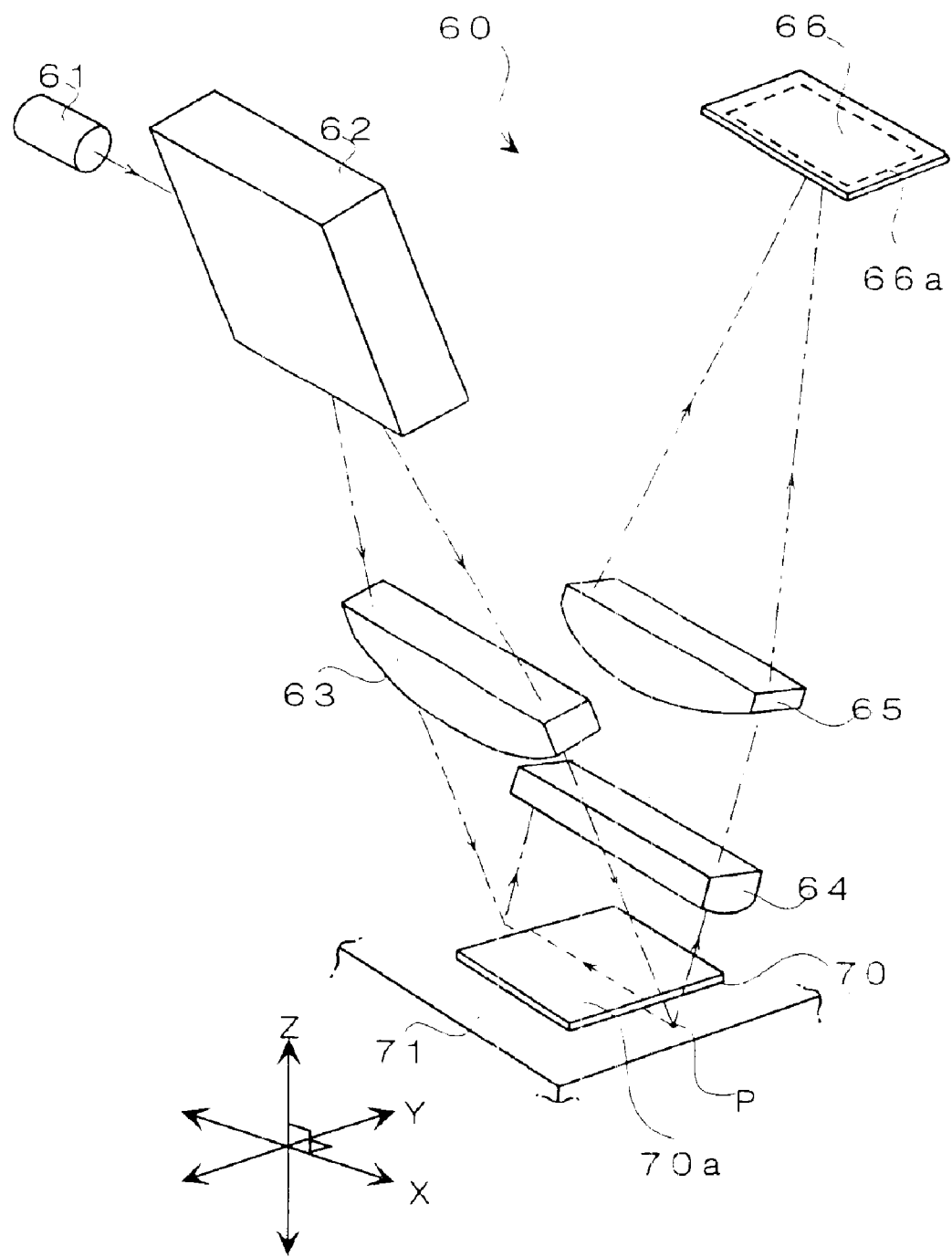
FIG. 21 is a schematic perspective view showing conventional scanning-type apparatus for measuring displacement.
Figure 22A:
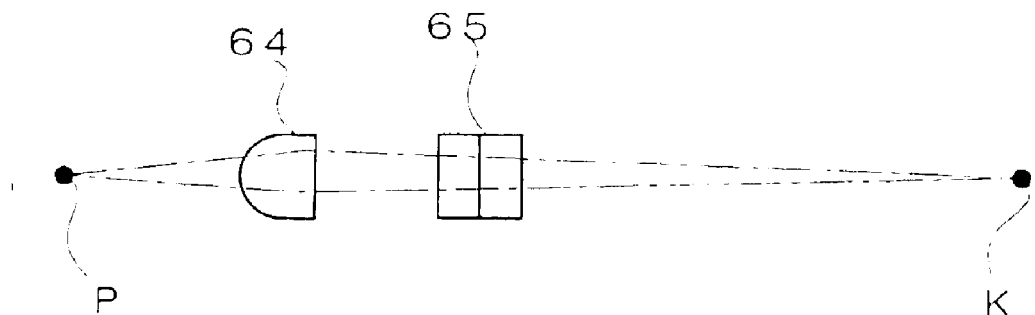
FIGS. 22A and 22B show the operation of a light receiving system of the conventional scanning-type apparatus for measuring displacement.
Figure 22B:
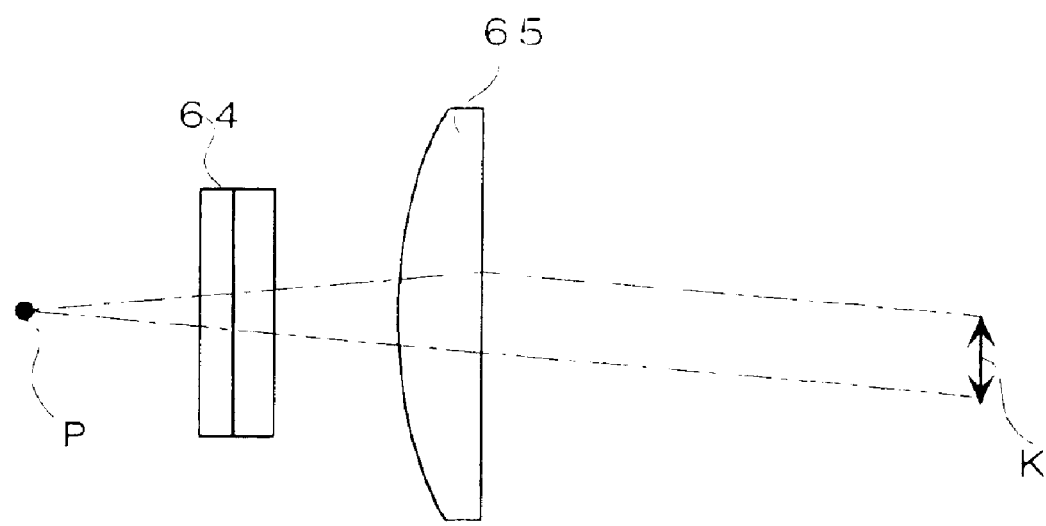
Figure 23:
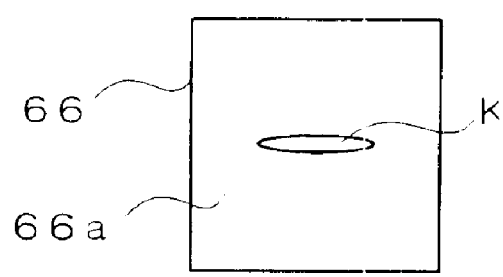
FIG. 23 shows an image formation point imaged on the light receiving plane of the conventional type apparatus for measuring displacement.
Figure 24:
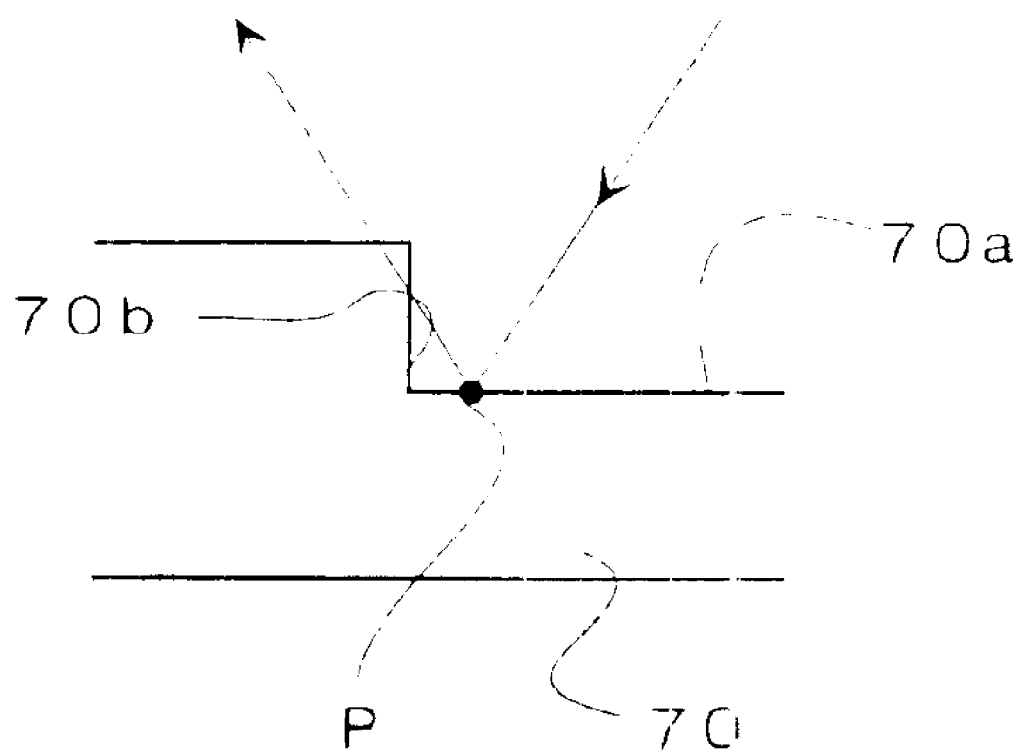
FIG. 24 is a side view showing a state in which scattered light is intercepted in case there is difference in a level in the vicinity of an irradiation point on a measuring object.

FIGS. 19A to 19C show deviation caused due to the dispersion of positions where condenser lenses in the lens array are set and others. FIG. 19A shows the contour of the surface 30a of the measuring object 30B.

FIG. 19B shows deviation caused by each condenser lens 7a to 7f of the lens array 7. As shown in FIG. 19B, the positions of image formation points K in the direction of displacement on the light receiving plane 9a of the light receiving element 9 are different every condenser lens 7a to 7f and displacement acquired from the position of an image formation point K includes predetermined deviation.

Current signals A and B including this deviation are input from the electrodes provided at both ends of the light receiving element 9 to the displacement operation means 41, operation processing is executed and a displacement signal for measurement D2 is output to the deviation detection means 45 (ST10)

In the meantime, when a scan initiation signal S and a clock pulse C are input to the counting means 43, each clock pulse is counted since the scan initiation signal S is input (ST11).

This count pulse C is output to the deviation detection means 45.

The deviation detection means 45 acquires the position of the currently scanned irradiation point P based upon clock pulses C'1 to C'n included in the count pulse C' and correlates it with a displacement signal for measurement D2 (ST12). In the correction value storage means 47, a displacement signal for calibration D1 (correction data E showing deviation) of each irradiation point P is stored at each address in the format of a table.

The deviation detection means 45 reads correction data E stored at the same count value (address) as the count value C' of a displacement signal for measurement D2 from the correction value storage means 47. The deviation detection means executes processing for subtracting the correction data E from the displacement signal for measurement D2 (ST13).

FIG. 19C shows a displacement signal of the measuring object 30B after operation for correction. As shown in FIG. 19C, a displacement signal in which the deviation of the lens array 7 is solved can be output by operating for correction using the correction data E.

As described above, the apparatus for measuring displacement according to the invention is useful for measuring the lit and bend of a lead IC, measuring the height of a solder ball of BGA, measuring the height of cream solder printed on a printed wiring board and measuring the height of a bump on a silicon wafer.

What is claimed is:

1. Apparatus for measuring displacement of a surface of a measuring object comprising:

projecting means having one convergent lens, said projecting means scanning radiated light on the surface of the measuring object through the convergent lens to form an irradiation point on the surface of the measuring object; and light receiving means including a light receiving element with a light receiving plane for receiving measuring beams reflected at the irradiation point to form an image formation point on the light receiving plane, a lens array composed of plural condenser lenses having a uniform image formation characteristic around an optical axis thereof and arranged in a scanning direction of the radiated light for converging the measuring beams reflected at the irradiation point, and an imaging lens having a uniform image formation characteristic around an optical axis thereof for converging the measuring beams passing through the lens array to form the image formation point on the light receiving plane so that an amount of the displacement on the surface of the measuring object is obtained by using triangulation of light reflected on the surface of the measuring object after passing though said one convergent lens, passing through said lens array and imaging lens, and forming the image formation point on the light receiving plane, and a signal different according to a location of the image formation point on the light receiving plane.

2. Apparatus for measuring displacement according to claim 1, wherein the light receiving element is provided in a position apart by a focal length from the imaging lens.

3. Apparatus for measuring displacement according to claim 1, wherein the plural condenser lenses have mutually parallel optical axes and are arranged in parallel in a position apart by a focal length from the irradiation point in a line orthogonal to each optical axis.

4. Apparatus for measuring displacement according to claim 1, wherein the lens array, the imaging lens and the light receiving element have a relationship expressed by an expression $0 < (f2/f1) \cdot t < w$, wherein w is a light receiving width parallel with a direction of a scan of the light receiving plane, t is a width parallel with the scanning direction of each condenser lens, f1 is a focal length of the condenser lens and f2 is a focal length of the imaging lens.

5. Apparatus for measuring displacement according to claim 1, wherein the projecting means scans the scanned radiated light perpendicular to the surface of the measuring object to form the irradiation point; and the light receiving means includes a pair of light receiving units provided at an equal distance from the irradiation point in symmetrical positions from th an optical path plane of the radiated light.

6. Apparatus for measuring displacement according to claim 5, further comprising displacement operation means that operates and outputs a displacement signal of the surface of the measuring object based upon a position of the image formation point formed on each light receiving plane of the pair of the light receiving units.

7. Apparatus for measuring displacement according to claim 6, wherein the displacement operation means comprises two preadders that respectively add a pair of electric signals acquired from symmetrical positions relative to the optical path plane of the radiated light after four electric signals corresponding to the position of image formation point on the each light receiving plane of the pair of the light receiving units are respectively converted from current to voltage;

an adder that adds each electric signal acquired in the preadders;

a subtracter that subtracts an electric signal acquired in one of the preadders from an electric signal acquired in the other of the preadders; and a divider that divides an electric signal acquired in the subtracter by an electric signal acquired in the adder.

8. Apparatus for measuring displacement according to claim 6, wherein the displacement operation means comprises an adder and a subtracter for each of the light receiving units, said adder adding a pair of electric signals after the pair of the electric signals corresponding to the position of the image formation point on the each light receiving plane of the light receiving units is respectively converted from current to voltage, said subtracter subtracting one of the pair of the electric signals from the other;

an addition signal adder that adds addition signals acquired from each adder;

a subtraction signal adder that adds subtraction signals acquired from each subtracter; and a divider that divides an electric signal acquired in the subtraction signal adder by an electric signal acquired in the addition signal adder.

9. Apparatus for measuring displacement according to claim 6, wherein the displacement operation means comprises an adder, a subtracter and a divider for each of the light receiving units, said adder adding a pair of electric signals after the pair of the electric signals corresponding to the position of the image formation point on the each light receiving plane of the light receiving units is respectively converted from current to voltage, said subtracter subtracting one of the pair of the electric signals from the other; and said divider dividing a subtraction signal acquired in the subtracter by an addition signal acquired in the adder;

switching means that receives each displacement signal corresponding to a divided value divided in the each divider and a displacement signal corresponding to an average value of the divided values so as to switchably output one of the displacement signals;

level determination means that determines whether the each addition signal meets a predetermined reference value or not; and selecting means that selectively outputs a suitable one of the each displacement signal input to the switching means by switching based upon a result of determination in the level determination means.

10. Apparatus for measuring displacement of a surface of a measuring object comprising:

projecting means that radiates light for scanning the light on the surface of the measuring object to form an irradiation point on the surface of the measuring object;

light receiving means including a light receiving element with a light receiving plane for receiving measuring beams from the irradiation point thereon to form an image formation point on the light receiving plane, a lens array composed of plural condenser lenses having a uniform image formation characteristic around an optical axis thereof and arranged in a scanning direction of the radiated light for converging the measuring beams, and an imaging lens having a uniform image formation characteristic around an optical axis thereof for converging the measuring beams to form the image formation point on the light receiving plane using triangulation of light;

displacement operation means that operates and outputs an amount of the displacement of the surface of the measuring object based upon a position of the image formation point formed on the light receiving plane of the light receiving element;

processing means that detects a deviation of the image formation point caused because by dispersion of the image formation point of light passed in the lens array in plural locations in a direction of a scan, corrects and outputs the amount of the displacement of the surface of the measuring object based upon the detected deviation, said processing means including deviation detection means for detecting the deviation of the image formation point using a reference object, correction value storage means for storing the deviation detected by the deviation detection means as correction data, and displacement correction means for correcting and outputting the amount of the displacement output from the displacement operation means based upon the correction data stored in the correction value storage means when the amount of the displacement of the surface of the measuring object is measured;

scan initiation detection means for outputting a scan initiation signal whenever the radiated light is scanned; and counting means for counting a current position scanned by the radiated light based upon the scan initiation signal from the scan initiation detection means, wherein said deviation detection means correlates the deviation with the current position scanned by the radiated light output from the counting means and stores in correction value storage means as correction data, and said displacement correction means reads the correction data corresponding to the current position scanned by the radiated light output from the counting means from the correction value storage means and corrects the amount of the displacement output from the displacement operation means by the correction data.

11. A method for measuring displacement, comprising:

scanning light on a surface of a measuring object through one convergent lens to form an irradiation point on the surface of the measuring object, converging the light from the irradiation point by a lens array composed of plural condenser lenses having a uniform image formation characteristic around an optical axis thereof and arranged in a scanning direction of the light, forming an image formation point on a light receiving plane of a light receiving element by an imaging lens, detecting a deviation of the image formation point on the light receiving plane of the light receiving element by using a reference object, correcting an amount of the displacement based upon the deviation, and measuring the amount of the displacement of the surface of the measuring object using triangulation of light without contact based upon the deviation of the image formation point on the light receiving plane.

12. A method according to claim 11, further comprising detecting a scan position of the light by counting time since the scan is started for detecting the deviation and correcting the amount of the displacement.

13. Apparatus for measuring displacement of a surface of a measuring object, comprising:

a light source for irradiating light, a deflector disposed between the light source and the measuring object for deflecting the light from the light source to scan the light on the surface of the measuring object at a first angle relative to the surface, a convergent lens disposed between the light source and the measuring object for converging the light from the deflector on the surface of the measuring object with the first angle, a lens array formed of plural condenser lenses and arranged in a line for converging the light reflected from the surface of the measuring object at a second angle relative to the surface different from the first angle, an imaging lens for converging the light from the lens array, and a light receiving element for receiving the light from the imaging lens converged at an image formation point on a light receiving plane thereof so that an amount of the displacement of the surface of the measuring object is obtained based upon a position of the image formation point formed on the light receiving plane using triangulation of light.

* * * * *